(12) United States Patent
Nagami

(10) Patent No.: US 12,379,572 B2
(45) Date of Patent: Aug. 5, 2025

(54) IMAGING LENS AND IMAGING APPARATUS

(71) Applicant: FUJIFILM Corporation, Tokyo (JP)

(72) Inventor: Ryosuke Nagami, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 678 days.

(21) Appl. No.: 17/723,184

(22) Filed: Apr. 18, 2022

(65) Prior Publication Data

US 2022/0342179 A1 Oct. 27, 2022

(30) Foreign Application Priority Data

Apr. 22, 2021 (JP) ................................. 2021-072676

(51) Int. Cl.
| | |
|---|---|
| *G02B 9/12* | (2006.01) |
| *G02B 7/04* | (2021.01) |
| *G02B 27/64* | (2006.01) |

(52) U.S. Cl.
CPC ................. *G02B 9/12* (2013.01); *G02B 7/04* (2013.01); *G02B 27/646* (2013.01)

(58) Field of Classification Search
CPC .......... G02B 9/12; G02B 7/04; G02B 27/646; G02B 9/64; G02B 13/02; G02B 15/143103; G03B 3/10; G03B 2205/0007; G03B 5/00; G03B 30/00
See application file for complete search history.

(56) References Cited

U.S. PATENT DOCUMENTS

| | | | |
|---|---|---|---|
| 10,386,617 B2 | 8/2019 | Kawamura | |
| 2016/0238819 A1 | 8/2016 | Sun | |
| 2017/0351089 A1 | 12/2017 | Gyoda et al. | |
| 2018/0172958 A1 | 6/2018 | Kawamura | |
| 2018/0246292 A1* | 8/2018 | Tomioka | ............... G02B 15/173 |

(Continued)

FOREIGN PATENT DOCUMENTS

| | | |
|---|---|---|
| JP | 2016-148793 A | 8/2016 |
| JP | 2017-215492 A | 12/2017 |

(Continued)

OTHER PUBLICATIONS

Lohmann, "Scaling laws for lens systems," Appl. Opt. 28, 4996-4998 (Year: 1989).*

(Continued)

*Primary Examiner* — Ricky L Mack
*Assistant Examiner* — K Muhammad
(74) *Attorney, Agent, or Firm* — Studebaker Brackett PLLC

(57) ABSTRACT

The imaging lens consists of, in order from the object side to the image side, a first lens group having a positive refractive power, a second lens group, and a third lens group. During focusing, the second lens group moves. The first lens group includes a first positive lens disposed to be closest to the object side, a second positive lens disposed closer to the image side than the first positive lens, and an LA lens disposed closer to the image side than the second positive lens. Assuming that a partial dispersion ratio and an Abbe number thereof are respectively θgFA and νA, the LA lens satisfies $0.02 < \theta gFA + 0.001618 \times \nu A - 0.6415 < 0.1$. The imaging lens satisfies predetermined conditional expressions.

20 Claims, 13 Drawing Sheets

(56) References Cited

U.S. PATENT DOCUMENTS

| | | |
|---|---|---|
| 2019/0271836 A1 | 9/2019 | Umeda et al. |
| 2020/0026047 A1 | 1/2020 | Hosoi et al. |
| 2022/0244502 A1* | 8/2022 | Komatsubara ........... G02B 9/64 |

FOREIGN PATENT DOCUMENTS

| | | |
|---|---|---|
| JP | 2018-018101 A | 2/2018 |
| JP | 2018-097276 A | 6/2018 |
| JP | 2021-026221 A | 2/2021 |
| WO | 2018/066649 A1 | 4/2018 |
| WO | 2018/088038 A1 | 5/2018 |
| WO | 2020/217791 A1 | 10/2020 |

OTHER PUBLICATIONS

An Office Action mailed by the Japanese Patent Office on Sep. 3, 2024, which corresponds to Japanese Patent Application No. 2021-072676 and is related to U.S. Appl. No. 17/723,184.

An Office Action; "Decision of Refusal," mailed by the Japanese Patent Office on Jan. 28, 2025, which corresponds to Japanese Patent Application No. 2021-072676 and is related to U.S. Appl. No. 17/723,184; with English language translation.

* cited by examiner

EXAMPLE 1

EXAMPLE 1

EXAMPLE 2

FIG. 6 EXAMPLE 3

EXAMPLE 4

IMAGING LENS AND IMAGING APPARATUS

CROSS-REFERENCE TO RELATED APPLICATIONS

The present application claims priority under 35 U.S.C. § 119 to Japanese Patent Application No. 2021-072676, filed on Apr. 22, 2021. The above application is hereby expressly incorporated by reference, in its entirety, into the present application.

BACKGROUND

Technical Field

A technique of the present disclosure relates to an imaging lens and an imaging apparatus.

Related Art

In the related art, as imaging lenses used in an imaging apparatus such as a digital camera and a video camera, the lens systems described in JP2018-018101A and JP2018-097276A are known.

In recent years, there has been a demand for a telephoto imaging lens having favorable optical performance and being lightweight.

SUMMARY

The present disclosure has been made in view of the above-mentioned circumstances, and an object of the present disclosure is to provide a telephoto imaging lens having favorable optical performance and light weight and an imaging apparatus comprising the imaging lens.

According to one aspect of the present disclosure, there is provided an imaging lens consisting of, in order from an object side to an image side: a first lens group that has a positive refractive power; a second lens group that has a refractive power; and a third lens group that has a refractive power, in which during focusing, the second lens group moves along an optical axis, a spacing between the first lens group and the second lens group changes, and a spacing between the second lens group and the third lens group changes, the first lens group includes a first positive lens disposed to be closest to the object side, a second positive lens disposed closer to the image side than the first positive lens, and an LA lens disposed closer to the image side than the second positive lens, assuming that a partial dispersion ratio of the LA lens between a g line and an F line is θgFA, an Abbe number of the LA lens based on a d line is νA, a height of the on-axis marginal ray from the optical axis on an object side surface of the LA lens in a state in which an infinite distance object is in focus is HAf, a height of the on-axis marginal ray from the optical axis on an object side surface of the first positive lens in a state in which the infinite distance object is in focus is H1f, a center thickness of the first positive lens is DL1, a maximum half angle of view of a whole system is ω, and a unit of ω is degree, Conditional Expressions (1), (2), (3), and (4) are satisfied, which are represented by $$0.02 < \theta gFA + 0.001618 \times \nu A - 0.6415 < 0.1 \quad (1),$$

$$0.45 < HAf/H1f < 0.8 \quad (2),$$

$$5 < H1f/DL1 < 10 \quad (3), \text{ and}$$

$$0.8 < \omega < 6 \quad (4).$$

It is preferable that the imaging lens of the above-mentioned aspect satisfies at least one of Conditional Expressions (2-1) or (3-1) represented by $$0.55 < HAf/H1f < 0.77 \quad (2-1), \text{ and}$$

$$5.5 < H1f/DL1 < 8.75 \quad (3-1).$$

It is preferable that assuming that a height of the on-axis marginal ray from the optical axis on an object side surface of the second positive lens in a state in which the infinite distance object is in focus is H2f, the imaging lens according to the above-mentioned aspect satisfies Conditional Expression (5) represented by $$0.7 < H2f/H1f < 0.95 \quad (5).$$

It is preferable that assuming that a height of the on-axis marginal ray from the optical axis on an object side surface of the second positive lens in a state in which the infinite distance object is in focus is H2f, and a center thickness of the second positive lens is DL2, the imaging lens according to the above-mentioned aspect satisfies Conditional Expression (6) represented by $$3.8 < H2f/DL2 < 14 \quad (6).$$

It is preferable that the first lens group includes an LB lens disposed closer to the image side than the LA lens, and assuming that a partial dispersion ratio of the LB lens between the g line and the F line is θgFB, and an Abbe number of the LB lens based on the d line is νB, the LB lens satisfies Conditional Expression (7) represented by $$0.02 < \theta gFB + 0.001618 \times \nu B - 0.6415 < 0.1 \quad (7).$$

It is preferable that assuming that a height of the on-axis marginal ray from the optical axis on an object side surface of the LB lens in a state in which the infinite distance object is in focus is HBf, the imaging lens according to the above-mentioned aspect satisfies Conditional Expression (8) represented by $$0.35 < HBf/H1f < 0.68 \quad (8).$$

It is preferable that assuming that a specific gravity of the first positive lens is Sg1, the first positive lens satisfies Conditional Expression (9) represented by $$2 < Sg1 < 3 \quad (9).$$

It is preferable that assuming that a specific gravity of the second positive lens is Sg2, the second positive lens satisfies Conditional Expression (10) represented by $$2 < Sg2 < 3 \quad (10).$$

It is preferable that the first lens group and the third lens group remain stationary with respect to an image plane during focusing.

It is preferable that the second lens group is a lens group that has a positive refractive power.

It is preferable that assuming that a focal length of the whole system in a state in which the infinite distance object is in focus is f, and a focal length of the second lens group is fG2, the imaging lens of the above-mentioned aspect satisfies Conditional Expression (11) represented by $$1.3 < |f|/|fG2| < 5 \quad (11).$$

It is preferable that assuming that a height of the on-axis marginal ray from the optical axis on a lens surface closest to the object side in the second lens group in a state in which the infinite distance object is in focus is HG2f, the imaging lens of the above-mentioned aspect satisfies Conditional Expression (12) represented by $$0.2 < HG2f/H1f < 0.55 \quad (12).$$

It is preferable that the third lens group includes a vibration-proof group that moves in a direction intersecting with the optical axis during image blur correction.

It is preferable that assuming that a focal length of the whole system in a state in which the infinite distance object is in focus is f, and a focal length of the vibration-proof group is fis, the imaging lens of the above-mentioned aspect satisfies Conditional Expression (13) represented by $$2.5 < f/|fis| < 15 \quad (13).$$

It is preferable that assuming that a height of the on-axis marginal ray from the optical axis on a lens surface closest to the object side in the vibration-proof group in a state in which the infinite distance object is in focus is set to Hisf, the imaging lens of the above-mentioned aspect satisfies Conditional Expression (14) represented by $$0.11 < Hisf/H1f < 0.4 \quad (14).$$

It is preferable that the third lens group includes a stop.

It is preferable that assuming that a distance on the optical axis from the lens surface closest to the object side in the first lens group to the stop is DSt, and a focal length of the whole system in a state where the infinite distance object is in focus is f, the imaging lens of the above-mentioned aspect satisfies Conditional Expression (15) represented by $$0.3 < DSt/f < 0.85 \quad (15).$$

It is preferable that assuming that a back focal length of the whole system at an air conversion distance in a state in which the infinite distance object is in focus is Bf, and a focal length of the whole system in a state where the infinite distance object is in focus is f, the imaging lens of the above-mentioned aspect satisfies Conditional Expression (16) represented by $$1 < Bf/(f \times \tan \omega) < 5.5 \quad (16).$$

According to another aspect of the present disclosure, there is provided an imaging apparatus comprising the imaging lens of the above-mentioned aspect.

In the present specification, it should be noted that the terms "consisting of" and "consists of" mean that the lens may include not only the above-mentioned components but also lenses substantially having no refractive powers, optical elements, which are not lenses, such as a stop, a filter, and a cover glass, and mechanism parts such as a lens flange, a lens barrel, an imaging element, and a camera shaking correction mechanism.

In the present specification, the term "~ group having a positive refractive power" means that the group has a positive refractive power as a whole. The terms "second lens group", "third lens group", and "vibration-proof group" are not limited to a configuration consisting of a plurality of lenses, but may be a configuration consisting of only one lens. It should be noted that the term "lens group" in the present specification refers to a part including at least one lens, which is a constituent part of the imaging lens and is divided by an air spacing that changes during focusing. During focusing, the lens groups move or remain stationary, and the mutual spacing between the lenses in one lens group does not change.

The term "a single lens" means one lens that is not cemented. Here, a compound aspherical lens (a lens in which a spherical lens and an aspherical film formed on the spherical lens are integrally formed and function as one aspherical lens as a whole) is not regarded as cemented lenses, but the compound aspherical lens is regarded as one lens. The sign of the refractive power, and the surface shape of the lens including the aspherical surface will be used in terms of the paraxial region unless otherwise specified.

In the present specification, the term "whole system" means an imaging lens. The "back focal length at the air conversion distance" is the air conversion distance on the optical axis from the lens surface closest to the image side in the whole system to the image plane. The "focal length" used in a conditional expression is a paraxial focal length. The values used in Conditional Expressions are values in a case where the d line is used as a reference in a state where the infinite distance object is in focus unless otherwise specified.

The "d line", "C line", "F line", and "g line" described in the present specification are emission lines. In the present specification, it is assumed that the d line wavelength is 587.56 nm (nanometers), the C line wavelength is 656.27 nm (nanometers), the F line wavelength is 486.13 nm (nanometers), and the g line wavelength is 435.84 nm (nanometers).

According to the present disclosure, it is possible to provide a telephoto imaging lens having favorable optical performance and light weight and an imaging apparatus comprising the imaging lens.

DESCRIPTION OF EMBODIMENTS

Hereinafter, embodiments of the present disclosure will be described with reference to the accompanying drawings.

Figure 1:
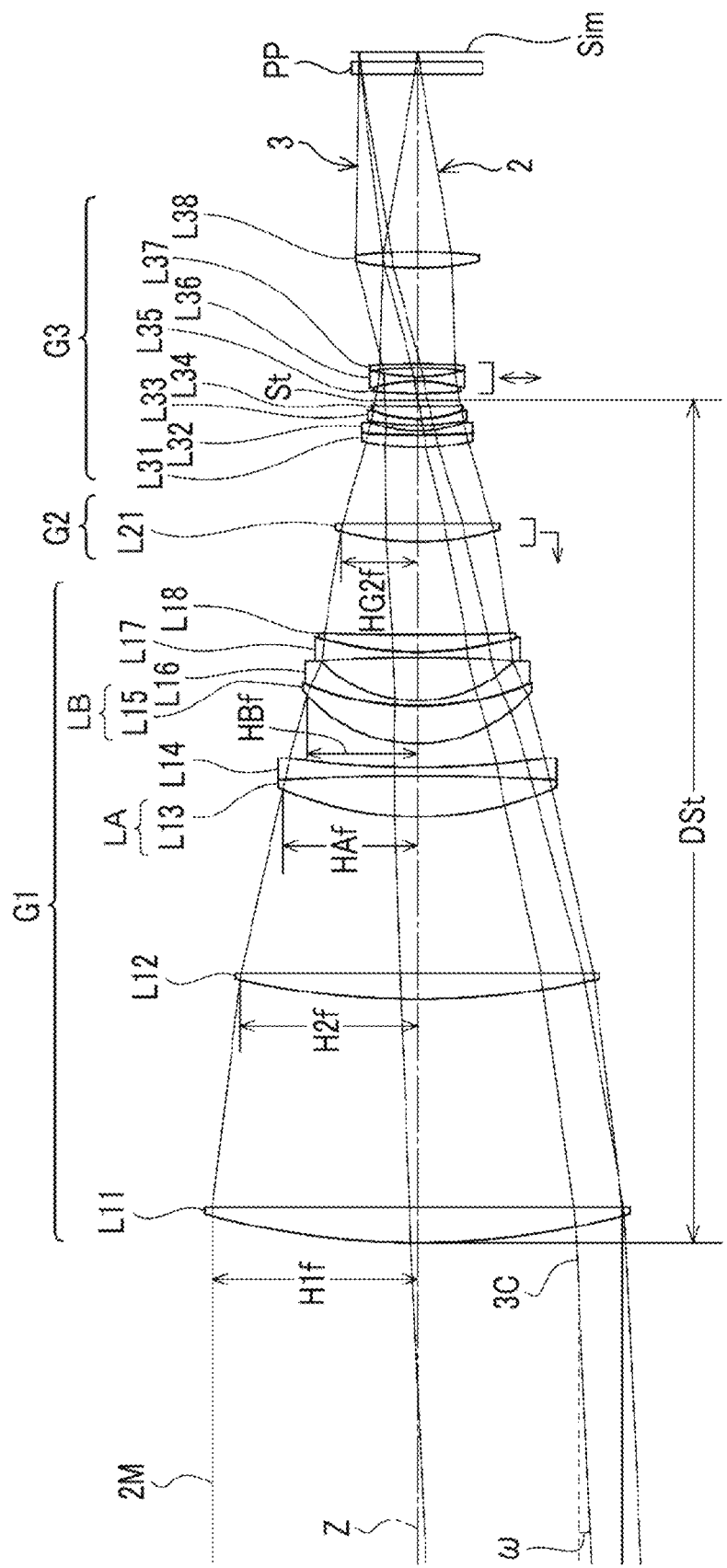
FIG. 1 is a cross-sectional view showing a configuration and luminous flux of an imaging lens according to an embodiment.

FIG. 1 shows a cross-sectional view of the configuration and luminous flux of the imaging lens according to the embodiment of the present disclosure in a state in which an infinite distance object is in focus. In the present specification, an object, of which an object distance (distance on the optical axis from the object to the lens surface closest to the object side) is at infinity, is referred to as the infinite distance object. The example shown in FIG. 1 corresponds to the imaging lens according to Example 1 to be described later. FIG. 1 shows, as the luminous flux, an on-axis luminous flux 2 and a luminous flux 3 with a maximum half angle of view ω. In FIG. 1, the left side is the object side and the right side is the image side.

FIG. 1 shows an example in which, assuming that an imaging lens is applied to an imaging apparatus, an optical member PP having a parallel plate shape is disposed between the imaging lens and the image plane Sim. The optical member PP is a member assumed to include various filters, a cover glass, and/or the like. The various filters include a low pass filter, an infrared cut filter, and/or a filter that cuts a specific wavelength region. The optical member PP is a member that has no refractive power. It is also possible to configure the imaging apparatus by removing the optical member PP.

The imaging lens of FIG. 1 consists of, in order from the object side to the image side along an optical axis Z, a first lens group G1 having a positive refractive power, a second lens group G2 having a refractive power, and a third lens group G3 having a refractive power. By forming the lens group closest to the object side as a lens group having a positive refractive power, it is easier to reduce the diameter of the lens group closer to the image side than the lens group. As a result, there is an advantage in achieving reduction in weight of the entire lens system.

For example, the imaging lens of FIG. 1 is configured as follows. The first lens group G1 consists of eight lenses L11 to L18 in order from the object side to the image side. The second lens group G2 consists of one lens L21. The third lens group G3 consists of four lenses L31 to L34, an aperture stop St, and four lenses L35 to L38 in order from the object side to the image side. The aperture stop St of FIG. 1 does not indicate a size and a shape, but indicates a position in the optical axis direction.

The imaging lens of the present embodiment is configured such that, during focusing, the second lens group G2 moves along the optical axis Z, the spacing between the first lens group G1 and the second lens group G2 changes, and the spacing between the second lens group G2 and the third lens group G3 changes. According to the configuration, it is possible to reduce the size and weight of the group that moves during focusing as compared with the configuration in which the entire lens system moves during focusing. In the present specification, the group that moves during focusing is hereinafter referred to as a "focus group". Focusing is performed by moving the focus group.

In the example of FIG. 1, only the second lens group G2 moves along the optical axis Z during focusing, and the first lens group G1 and the third lens group G3 remain stationary with respect to the image plane Sim. By adopting a configuration in which the focus group consists of only the second lens group G2 as in the example of FIG. 1, it is possible to reduce the size and weight of the focus unit. The arrow pointing to the left below the second lens group G2 in FIG. 1 indicates that the second lens group G2 is a focus group moving toward the object side during focusing from the infinite distance object to an extremely close-range object.

The first lens group G1 includes a first positive lens having a positive refractive power closest to the object side. By forming the lens closest to the object side in the lens system as a positive lens, it is easier to reduce the diameter of the lens closer to the image side than the lens. As a result, there is an advantage in achieving reduction in weight of the entire lens system.

The first lens group G1 includes an LA lens, which satisfies Conditional Expression (1), closer to the image side than the first positive lens. Here, the partial dispersion ratio of the LA lens between the g line and the F line is θgFA, and the Abbe number of the LA lens based on the d line is νA. By not allowing the corresponding value of Conditional Expression (1) to be equal to or less than the lower limit, it is possible to suppress insufficient correction of secondary chromatic aberration. By not allowing the corresponding value of Conditional Expression (1) to be equal to or greater than the upper limit, it is possible to suppress excessive correction of secondary chromatic aberration. In order to obtain more favorable characteristics, it is more preferable that the LA lens satisfies Conditional Expression (1-1), and it is yet more preferable that the imaging lens satisfies Conditional Expression (1-2). For example, in the example of FIG. 1, a lens L11 corresponds to the first positive lens and a lens L13 corresponds to the LA lens.

$$0.02 < \theta gFA + 0.001618 \times \nu A - 0.6415 < 0.1 \quad (1)$$

$$0.03 < \theta gFA + 0.001618 \times \nu A - 0.6415 < 0.1 \quad (1\text{-}1)$$

$$0.045 < \theta gFA + 0.001618 \times \nu A - 0.6415 < 0.1 \quad (1\text{-}2)$$

Conditional Expression (1) is an expression relating to anomalous dispersibility of the lens material. It can be said that the lens LA, which satisfies Conditional Expression (1), is a lens having high anomalous dispersibility. However, in general, a material having high anomalous dispersibility has a large specific gravity. In order to achieve both favorable aberration correction and reduction in weight, it is preferable that the imaging lens is configured to satisfy Conditional Expression (2). Here, a height of an on-axis marginal ray 2M on the object side surface of the LA lens from the optical axis Z is HAf, and a height of the on-axis marginal ray 2M on the object side surface of the first positive lens from the optical axis Z is H1f. HAf and H1f are values in a state in which the infinite distance object is in focus. For example, as shown in FIG. 1, the on-axis marginal ray 2M is a ray with the maximum height from the optical axis Z at the position of the aperture stop St in the rays included in the on-axis luminous flux 2. By not allowing the corresponding value of Conditional Expression (2) to be equal to or less than the lower limit, the focusing operation is prevented from becoming excessively strong on the object side of the lens having anomalous dispersibility. As a result, there is an advantage in correcting secondary longitudinal chromatic aberration. By not allowing the corresponding value of Conditional Expression (2) to be equal to or greater than the upper limit, it is possible to suppress an increase in outer diameter of a lens having a large specific gravity and high anomalous dispersibility. As a result, there is an advantage in achieving reduction in weight. In order to obtain more favorable characteristics, it is more preferable that the imaging lens satisfies Conditional Expression (2-1), and it is yet more preferable that the imaging lens satisfies Conditional Expression (2-2).

$$0.45 < HAf/H1f < 0.8 \quad (2)$$

$$0.55 < HAf/H1f < 0.77 \quad (2\text{-}1)$$

$$0.6 < HAf/H1f < 0.75 \quad (2\text{-}2)$$

Further, it is preferable that the first lens group G1 includes a second positive lens having a positive refractive power between the first positive lens and the LA lens. That is, it is preferable that the first lens group G1 includes the first positive lens disposed closest to the object side, the second positive lens disposed closer to the image side than the first positive lens, and the LA lens disposed closer to the image side than the second positive lens. By further disposing the second positive lens in addition to the first positive lens closer to the object side than the LA lens, it is easier to reduce the diameter of the lens having a large specific gravity and high anomalous dispersibility. As a result, there is an advantage in achieving reduction in weight. For example, in the example of FIG. 1, the lens L12 corresponds to the second positive lens.

Further, assuming that the center thickness of the first positive lens is DL1, it is preferable that the imaging lens satisfies Conditional Expression (3). The center thickness is a thickness on the optical axis. H1f of Conditional Expression (3) is the same as H1f in the description of Conditional Expression (2). By not allowing the corresponding value of Conditional Expression (3) to be equal to or less than the lower limit, it is possible to suppress an increase in volume of the first positive lens. As a result, there is an advantage in achieving reduction in weight. By not allowing the corresponding value of Conditional Expression (3) to be equal to or greater than the upper limit, the center thickness of the first positive lens is prevented from becoming excessively thin with respect to the outer diameter of the first positive lens. Therefore, it is easy to ensure a suitable positive refractive power. As a result, there is an advantage in reducing the diameter of the lens closer to the image side than the first positive lens, and there is an advantage in achieving reduction in weight of the entire lens system. In order to obtain more favorable characteristics, it is more preferable that the imaging lens satisfies Conditional Expression (3-1), and it is yet more preferable that the imaging lens satisfies Conditional Expression (3-2).

$$5 < H1f/DL1 < 10 \tag{3}$$

$$5.5 < H1f/DL1 < 8.75 \tag{3-1}$$

$$5.8 < H1f/DL1 < 8.5 \tag{3-2}$$

The configuration advantageous for reduction in weight as described above is particularly effective for a telephoto imaging lens having a long focal length. The reason for this is that an imaging lens having a long focal length generally tends to be large and therefore heavy. From the circumstances, it is preferable that the imaging lens is a lens system that satisfies Conditional Expression (4). Here, the maximum half angle of view of the imaging lens is ω, and the unit of ω is degrees. FIG. 1 shows ω as an example thereof. In FIG. 1, an axis parallel to the optical axis Z is indicated by a dotted line, and an angle formed by the axis and the principal ray 3C of the luminous flux 3 is indicated as ω. By satisfying Conditional Expression (4), it is possible to make the effect of the present embodiment on reduction in weight remarkable in the telephoto lens system. In order to obtain more favorable characteristics, it is more preferable that the imaging lens satisfies Conditional Expression (4-1), and it is yet more preferable that the imaging lens satisfies Conditional Expression (4-2).

$$0.8 < \omega < 6 \tag{4}$$

$$1 < \omega < 4.5 \tag{4-1}$$

$$1.2 < \omega < 3 \tag{4-2}$$

From the above, the imaging lens of the preferred embodiment of the present embodiment consists of the first lens group G1 having a positive refractive power, the second lens group G2, and the third lens group G3 having a positive refractive force in order from the object side to the image side. During focusing, the second lens group G2 moves along the optical axis Z, the spacing between the first lens group G1 and the second lens group G2 changes, and the spacing between the second lens group G2 and the third lens group G3 changes. The first lens group G1 is configured to include the first positive lens disposed closest to the object side, the second positive lens disposed closer to the image side than the first positive lens, and the LA lens disposed closer to the image side than the second positive lens, and satisfy Conditional Expressions (1), (2), (3), and (4).

In general, most of the telephoto imaging lenses with a long focal length each have a configuration in which the object side is positive and the image side is negative. Even in a telephoto imaging lens, in a case where the F number is to be made as small as possible, the outer diameter of the positive lens on the object side is large. On the other hand, a lens material having high anomalous dispersibility is used in correction of secondary chromatic aberration, but in general, the specific gravity of such a material is large. Due to the above-mentioned circumstances, in a telephoto imaging lens, both the outer diameter and the specific gravity are generally large. Therefore, the weight of the lens system as a whole is large.

In the above-mentioned preferred embodiment of the imaging lens, the diameter and weight of the LA lens are reduced by disposing two positive lenses closer to the object side than the LA lens having high anomalous dispersibility, and the weight is reduced by specifying the center thickness of the first positive lens. According to the above-mentioned preferred embodiment of the imaging lens having such an effect, it is possible to make the lens lightweight while maintaining favorable optical performance.

It is preferable that the imaging lens according to the embodiment of the present disclosure has the following configuration. Assuming that a height of the on-axis marginal ray 2M from the optical axis Z on the object side surface of the second positive lens is H2f, it is preferable that the imaging lens satisfies Conditional Expression (5). H2f is a value in a state in which the infinite distance object is in focus. H1f of Conditional Expression (5) is the same as H1f in the description of Conditional Expression (2). By not allowing the corresponding value of Conditional Expression (5) to be equal to or less than the lower limit, the focusing operation is prevented from becoming excessively strong only with the first positive lens. As a result, there is an advantage in correcting spherical aberration. By not allowing the corresponding value of Conditional Expression (5) to be equal to or greater than the upper limit, it is possible to suppress an increase in outer diameter of the second positive lens. As a result, there is an advantage in achieving reduction in weight. In order to obtain more favorable characteristics, it is more preferable that the imaging lens satisfies Conditional Expression (5-1), and it is yet more preferable that the imaging lens satisfies Conditional Expression (5-2).

$$0.7 < H2f/H1f < 0.95 \tag{5}$$

$$0.75 < H2f/H1f < 0.93 \tag{5-1}$$

$$0.8 < H2f/H1f < 0.91 \tag{5-2}$$

Assuming that the center thickness of the second positive lens is DL2, it is preferable that the imaging lens satisfies Conditional Expression (6). H2f of Conditional Expression (6) is the same as H2f in the description of Conditional Expression (5). By not allowing the corresponding value of Conditional Expression (6) to be equal to or less than the lower limit, it is possible to suppress an increase in volume of the second positive lens. As a result, there is an advantage in achieving reduction in weight. By not allowing the corresponding value of Conditional Expression (6) to be equal to or greater than the upper limit, the center thickness of the second positive lens is prevented from becoming excessively thin with respect to the outer diameter of the second positive lens. Therefore, it is easy to ensure a suitable positive refractive power. As a result, there is an advantage in reducing the diameter of the lens closer to the image side than the second positive lens, and there is an advantage in achieving reduction in weight of the entire lens system. In order to obtain more favorable characteristics, it is more preferable that the imaging lens satisfies Conditional Expression (6-1), and it is yet more preferable that the imaging lens satisfies Conditional Expression (6-2).

$$3.8 < H2f/DL2 < 14 \tag{6}$$

$$4.5 < H2f/DL2 < 13 \tag{6-1}$$

$$5 < H2f/DL2 < 12 \tag{6-2}$$

Further, for favorable chromatic aberration correction, it is preferable that the first lens group G1 includes an LB lens, which satisfies Conditional Expression (7), closer to the image side than the LA lens. Here, a partial dispersion ratio of the LB lens between the g line and the F line is $\theta gFB$, and an Abbe number of the LB lens based on the d line is $\nu B$. By not allowing the corresponding value of Conditional Expression (7) to be equal to or less than the lower limit, it is possible to suppress insufficient correction of secondary chromatic aberration. By not allowing the corresponding value of Conditional Expression (7) to be equal to or greater than the upper limit, it is possible to suppress excessive correction of secondary chromatic aberration. In order to obtain more favorable characteristics, it is more preferable that the LB lens satisfies Conditional Expression (7-1), and it is yet more preferable that the imaging lens satisfies Conditional Expression (7-2). For example, in the example of FIG. 1, the lens L15 corresponds to the LB lens.

$$0.02 < \theta gFB + 0.001618 \times \nu B - 0.6415 < 0.1 \tag{7}$$

$$0.03 < \theta gFB + 0.001618 \times \nu B - 0.6415 < 0.1 \tag{7-1}$$

$$0.045 < \theta gFB + 0.001618 \times \nu B - 0.6415 < 0.1 \tag{7-2}$$

Similarly to Conditional Expression (1), Conditional Expression (7) is an expression relating to anomalous dispersibility of the lens material. It can be said that the lens LB which satisfies Conditional Expression (7) is a lens having high anomalous dispersibility. As described above, a material having high anomalous dispersibility has a large specific gravity. In a case where the first lens group G1 includes the LB lens, it is preferable that the imaging lens is configured to satisfy Conditional Expression (8) in order to achieve both favorable aberration correction and reduction in weight. Here, a height of the on-axis marginal ray 2M on the object side surface of the LB lens from the optical axis Z is HBf. HBf is a value in a state in which the infinite distance object is in focus. H1f of Conditional Expression (8) is the same as H1f in the description of Conditional Expression (2). By not allowing the corresponding value of Conditional Expression (8) to be equal to or less than the lower limit, the focusing operation is prevented from becoming excessively strong on the object side of the lens having anomalous dispersibility. As a result, there is an advantage in correcting secondary longitudinal chromatic aberration. By not allowing the corresponding value of Conditional Expression (8) to be equal to or greater than the upper limit, it is possible to suppress an increase in outer diameter of a lens having a large specific gravity and high anomalous dispersibility. As a result, there is an advantage in achieving reduction in weight. In order to obtain more favorable characteristics, it is more preferable that the imaging lens satisfies Conditional Expression (8-1), and it is yet more preferable that the imaging lens satisfies Conditional Expression (8-2).

$$0.35 < HBf/H1f < 0.68 \tag{8}$$

$$0.4 < HBf/H1f < 0.65 \tag{8-1}$$

$$0.45 < HBf/H1f < 0.63 \tag{8-2}$$

Assuming that a specific gravity of the first positive lens is Sg1, it is preferable that the first positive lens satisfies Conditional Expression (9). By not allowing the corresponding value of Conditional Expression (9) to be equal to or less than the lower limit, it is possible to suppress the narrowing of the material options of the first positive lens. As a result, there is an advantage in correcting aberrations. By not allowing the corresponding value of Conditional Expression (9) to be equal to or greater than the upper limit, it is possible to suppress an increase in specific gravity of the first positive lens. As a result, there is an advantage in achieving reduction in weight. In order to obtain more favorable characteristics, it is more preferable that the imaging lens satisfies Conditional Expression (9-1), and it is yet more preferable that the imaging lens satisfies Conditional Expression (9-2).

$$2 < Sg1 < 3 \tag{9}$$

$$2.1 < Sg1 < 2.8 \tag{9-1}$$

$$2.2 < Sg1 < 2.6 \tag{9-2}$$

Assuming that a specific gravity of the second positive lens is Sg2, it is preferable that the second positive lens satisfies Conditional Expression (10). By not allowing the corresponding value of Conditional Expression (10) to be equal to or less than the lower limit, it is possible to suppress the narrowing of the material options of the second positive lens. As a result, there is an advantage in correcting aberrations. By not allowing the corresponding value of Conditional Expression (10) to be equal to or greater than the upper limit, it is possible to suppress an increase in specific gravity of the second positive lens. As a result, there is an advantage in achieving reduction in weight. In order to obtain more favorable characteristics, it is more preferable that the imaging lens satisfies Conditional Expression (10-1), and it is yet more preferable that the imaging lens satisfies Conditional Expression (10-2).

$$2 < Sg2 < 3 \tag{10}$$

$$2.1 < Sg2 < 2.8 \tag{10-1}$$

$$2.2 < Sg2 < 2.6 \tag{10-2}$$

It is preferable that the second lens group G2 is a lens group having a positive refractive power. In such a case, there is an advantage in reducing the diameter of the third lens group G3.

Assuming that a focal length of the whole system is f and a focal length of the second lens group G2 is fG2, it is preferable that the imaging lens satisfies Conditional Expression (11). f is a value in a state in which the infinite distance object is in focus. By not allowing the corresponding value of Conditional Expression (11) to be equal to or less than the lower limit, the refractive power of the second lens group G2 is prevented from becoming excessively weak. Therefore, it is possible to suppress an increase in amount of movement of the second lens group G2 during focusing. Thereby, there is an advantage in achieving reduction in weight of the focus unit. By not allowing the corresponding value of Conditional Expression (11) to be equal to or greater than the upper limit, the refractive power of the second lens group G2 is prevented from becoming excessively strong. As a result, there is an advantage in suppressing the performance change with respect to the change in the imaging distance. In order to obtain more favorable characteristics, it is more preferable that the imaging lens satisfies Conditional Expression (11-1), and it is yet more preferable that the imaging lens satisfies Conditional Expression (11-2).

$$1.3 < f/|fG2| < 5 \tag{11}$$

$$1.5 < f/|fG2| < 4 \tag{11-1}$$

$$1.7 < f/|fG2| < 3 \tag{11-2}$$

Assuming that a height of the on-axis marginal ray 2M from the optical axis Z on the lens surface closest to the object side in the second lens group G2 is HG2f, it is preferable that the imaging lens satisfies Conditional Expression (12). HG2f is a value in a state in which the infinite distance object is in focus. H1f of Conditional Expression (12) is the same as H1f in the description of Conditional Expression (2). Generally, in a telephoto imaging lens, the diameter of the on-axis luminous flux 2 is substantially smaller at a position closer to the image plane Sim. Therefore, by not allowing the corresponding value of Conditional Expression (12) to be equal to or less than the lower limit, it is easy for the second lens group G2 to be disposed to be farther from the image plane Sim. In a case where the lens diameter of the second lens group G2 is determined in consideration of ensuring the peripheral light amount, the outer diameter of the second lens group G2 tends to be smaller in a case where the second lens group G2 does not come excessively close to the image plane Sim. From the above-mentioned circumstances, by not allowing the corresponding value of Conditional Expression (12) to be equal to or less than the lower limit, it is easy to reduce the diameter of the second lens group G2. As a result, there is an advantage in achieving reduction in weight of the focus unit. By not allowing the corresponding value of Conditional Expression (12) to be equal to or greater than the upper limit, it is possible to suppress an increase in diameter of the second lens group G2. As a result, there is an advantage in achieving reduction in weight of the focus unit. In order to obtain more favorable characteristics, it is more preferable that the imaging lens satisfies Conditional Expression (12-1), and it is yet more preferable that the imaging lens satisfies Conditional Expression (12-2).

$$0.2 < HG2f/H1f < 0.55 \tag{12}$$

$$0.25 < HG2f/H1f < 0.52 \tag{12-1}$$

$$0.3 < HG2f/H1f < 0.5 \tag{12-2}$$

It is preferable that the third lens group G3 includes a vibration-proof group that moves in a direction intersecting with the optical axis Z during image blur correction. In a case where the first lens group G1 is configured to include the vibration-proof group, the diameter of the on-axis luminous flux 2 is large. Therefore, the vibration-proof group is large. Further, in a case where the second lens group G2 is configured to include the vibration-proof group, the focus unit is configured to include the vibration-proof group. Therefore, the focus unit is large. Therefore, it is preferable that the vibration-proof group is disposed in the third lens group G3.

For example, in the example of FIG. 1, the vibration-proof group consists of three lenses, lenses L35 to L37. The vertical arrows below the lenses L35 to L37 in FIG. 1 indicate that the vibration-proof group consists of these three lenses.

In the configuration in which the third lens group G3 includes the vibration-proof group, assuming that a focal length of the vibration-proof group is fis, it is preferable that the imaging lens satisfies Conditional Expression (13). f of Conditional Expression (13) is the same as f in the description of Conditional Expression (11). By not allowing the corresponding value of Conditional Expression (13) to be equal to or less than the lower limit, the refractive power of the vibration-proof group is prevented from becoming excessively weak. Therefore, it is possible to suppress an increase in amount of movement of the vibration-proof group during image blur correction. Thereby, there is an advantage in achieving reduction in weight of the vibration-proof group. By not allowing the corresponding value of Conditional Expression (13) to be equal to or greater than the upper limit, the refractive power of the vibration-proof group is prevented from becoming excessively strong. As a result, there is an advantage in suppressing the performance change during image blur correction. In order to obtain more favorable characteristics, it is more preferable that the imaging lens satisfies Conditional Expression (13-1), and it is yet more preferable that the imaging lens satisfies Conditional Expression (13-2).

$$2.5 < f/|fis| < 15 \tag{13}$$

$$3 < f/|fis| < 12 \tag{13-1}$$

$$3.5 < f/|fis| < 10 \tag{13-2}$$

In the configuration in which the third lens group G3 includes the vibration-proof group, assuming that a height of the on-axis marginal ray 2M from the optical axis Z on the lens surface closest to the object side in the vibration-proof group is Hisf, it is preferable that the imaging lens satisfies Conditional Expression (14). Hisf is a value in a state in which the infinite distance object is in focus. H1f of Conditional Expression (14) is the same as H1f in the description of Conditional Expression (2). Generally, in a telephoto imaging lens, the diameter of the on-axis luminous flux 2 is substantially smaller at a position closer to the image plane Sim. Therefore, by not allowing the corresponding value of Conditional Expression (14) to be equal to or less than the lower limit, it is easy for the vibration-proof group to be disposed to be farther from the image plane Sim. In a case where the lens diameter of the vibration-proof group is determined in consideration of ensuring the peripheral light amount, the outer diameter of the vibration-proof group tends to be smaller in a case where the vibration-proof group does not come excessively close to the image plane Sim. From the above-mentioned circumstances, by not allowing the corresponding value of Conditional Expression (14) to be equal to or less than the lower limit, it is easy to reduce the diameter of the vibration-proof group. As a result, there is an advantage in achieving reduction in weight of the vibration-proof group. By not allowing the corresponding value of Conditional Expression (14) to be equal to or greater than the upper limit, it is possible to suppress an increase in diameter of the vibration-proof group. As a result, there is an advantage in achieving reduction in weight of the vibration-proof group. In order to obtain more favorable characteristics, it is more preferable that the imaging lens satisfies Conditional Expression (14-1), and it is yet more preferable that the imaging lens satisfies Conditional Expression (14-2).

$$0.11 < Hisf/H1f < 0.4 \tag{14}$$

$$0.13 < Hisf/H1f < 0.37 \tag{14-1}$$

$$0.15 < Hisf/H1f < 0.35 \tag{14-2}$$

It is preferable that the third lens group G3 includes an aperture stop St. In such a case, there is an advantage in reducing the diameter of the second lens group G2 and the third lens group G3.

Assuming that a distance on the optical axis from the lens surface closest to the object side in the first lens group G1 to the aperture stop St is DSt, it is preferable that the imaging lens satisfies Conditional Expression (15). f of Conditional Expression (15) is the same as f in the description of Conditional Expression (11). By not allowing the corresponding value of Conditional Expression (15) to be equal to or less than the lower limit, the aperture stop St can be positioned closer to the image side. As a result, there is an advantage in reducing the diameter of the aperture stop St. By not allowing the corresponding value of Conditional Expression (15) to be equal to or greater than the upper limit, the aperture stop St can be positioned closer to the object side. Therefore, there is an advantage in reducing the angle of incidence of the principal ray 3C of the luminous flux 3 on the image plane Sim. In order to obtain more favorable characteristics, it is more preferable that the imaging lens satisfies Conditional Expression (15-1), and it is yet more preferable that the imaging lens satisfies Conditional Expression (15-2).

$$0.3 < DSt/f < 0.85 \tag{15}$$

$$0.35 < DSt/f < 0.8 \tag{15-1}$$

$$0.4 < DSt/f < 0.75 \tag{15-2}$$

Assuming that a back focal length of the whole system at the air conversion distance is Bf, it is preferable that the imaging lens satisfies Conditional Expression (16). Bf is a value in a state in which the infinite distance object is in focus. f of Conditional Expression (16) is the same as f in the description of Conditional Expression (11). By not allowing the corresponding value of Conditional Expression (16) to be equal to or less than the lower limit, the back focal length is prevented from becoming excessively short with respect to the image circle. As a result, there is an advantage in reducing the diameter of the third lens group G3. By not allowing the corresponding value of Conditional Expression (16) to be equal to or greater than the upper limit, the back focal length is prevented from becoming excessively long with respect to the image circle. As a result, there is an advantage in shortening the total length of the lens system. In order to obtain more favorable characteristics, it is more preferable that the imaging lens satisfies Conditional Expression (16-1), and it is yet more preferable that the imaging lens satisfies Conditional Expression (16-2).

$$1 < Bf/(f \times \tan \omega) < 5.5 \tag{16}$$

$$1.5 < Bf/(f \times \tan \omega) < 5 \tag{16-1}$$

$$2.2 < Bf/(f \times \tan \omega) < 4.7 \tag{16-2}$$

Assuming that a sum of Bf and the distance on the optical axis from the lens surface closest to the object side in the first lens group G1 to the lens surface closest to the image side in the third lens group G3 is TL, it is preferable that the imaging lens satisfies Conditional Expression (17). Bf is the same as Bf in the description of Conditional Expression (16). TL is a value in a state in which the infinite distance object is in focus. f of Conditional Expression (17) is the same as f in the description of Conditional Expression (11). By not allowing the corresponding value of Conditional Expression (17) to be equal to or less than the lower limit, the total length of the lens system is prevented from becoming excessively short with respect to the focal length. As a result, there is an advantage in correcting aberrations. By not allowing the corresponding value of Conditional Expression (17) to be equal to or greater than the upper limit, the total length of the lens system is prevented from becoming excessively long with respect to the focal length. As a result, there is an advantage in achieving reduction in weight. In order to obtain more favorable characteristics, it is more preferable that the imaging lens satisfies Conditional Expression (17-1), and it is yet more preferable that the imaging lens satisfies Conditional Expression (17-2).

$$0.73 < TL/f < 1.05 \tag{17}$$

$$0.75 < TL/f < 1.03 \tag{17-1}$$

$$0.78 < TL/f < 1.01 \tag{17-2}$$

Assuming that an F number of the whole system is FNo, it is preferable that the imaging lens satisfies Conditional Expression (18). FNo is a value in a state in which the infinite distance object is in focus. Assuming that an opening diameter of the aperture stop St is variable, FNo is an open F number. f of Conditional Expression (18) is the same as f in the description of Conditional Expression (11). By not allowing the corresponding value of Conditional Expression (18) to be equal to or less than the lower limit, the technique of the present disclosure can be applied to a lens system having an appropriate size. Therefore, the effect of reduction in weight can be obtained. By not allowing the corresponding value of Conditional Expression (18) to be equal to or greater than the upper limit, it is possible to suppress an excessive increase in size of the lens system. Therefore, effective reduction in weight is possible. In order to obtain more favorable characteristics, it is more preferable that the imaging lens satisfies Conditional Expression (18-1), and it is yet more preferable that the imaging lens satisfies Conditional Expression (18-2).

$$65 < f/FNo < 145 \tag{18}$$

$$80 < f/FNo < 120 \tag{18-1}$$

$$90 < f/FNo < 105 \tag{18-2}$$

Assuming that an Abbe number of the first positive lens based on the d line is v1, it is preferable that the imaging lens satisfies Conditional Expression (19). By not allowing the corresponding value of Conditional Expression (19) to be equal to or less than the lower limit, it is easy to correct longitudinal chromatic aberration. Generally, a material having a large Abbe number has a large specific gravity. By not allowing the corresponding value of Conditional Expression (19) to be equal to or greater than the upper limit, there is an advantage in achieving reduction in weight of the first positive lens. In order to obtain more favorable characteristics, it is more preferable that the imaging lens satisfies Conditional Expression (19-1), and it is yet more preferable that the imaging lens satisfies Conditional Expression (19-2).

$$50<v1<80 \tag{19}$$

$$55<v1<80 \tag{19-1}$$

$$60<v1<80 \tag{19-2}$$

Assuming that an Abbe number of the second positive lens based on the d line is v2, it is preferable that the imaging lens satisfies Conditional Expression (20). By not allowing the corresponding value of Conditional Expression (20) to be equal to or less than the lower limit, it is easy to correct longitudinal chromatic aberration. As described in the description of Conditional Expression (19), in general, a material having a large Abbe number has a large specific gravity. By not allowing the corresponding value of Conditional Expression (20) to be equal to or greater than the upper limit, there is an advantage in achieving reduction in weight of the second positive lens. In order to obtain more favorable characteristics, it is more preferable that the imaging lens satisfies Conditional Expression (20-1), and it is yet more preferable that the imaging lens satisfies Conditional Expression (20-2).

$$50<v2<80 \tag{20}$$

$$55<v2<80 \tag{20-1}$$

$$60<v2<80 \tag{20-2}$$

Assuming that an Abbe number of the LA lens based on the d line is vA, it is preferable that the imaging lens satisfies Conditional Expression (21). By not allowing the corresponding value of Conditional Expression (21) to be equal to or less than the lower limit, there is an advantage in suppressing chromatic aberration. In general, a material having a very large Abbe number has a low refractive index. Therefore, it is difficult for a lens made of such a material to ensure a refractive power. By not allowing the corresponding value of Conditional Expression (21) to be equal to or greater than the upper limit, it is easy to ensure the refractive power of the LA lens. As a result, there is an advantage in reducing the diameter of the lens closer to the image side than the LA lens. In order to obtain more favorable characteristics, it is more preferable that the imaging lens satisfies Conditional Expression (21-1), and it is yet more preferable that the imaging lens satisfies Conditional Expression (21-2).

$$72<vA<120 \tag{21}$$

$$82<vA<120 \tag{21-1}$$

$$92<vA<120 \tag{21-1}$$

Assuming that an Abbe number of the LB lens based on the d line is vB, it is preferable that the imaging lens satisfies Conditional Expression (22). By not allowing the corresponding value of Conditional Expression (22) to be equal to or less than the lower limit, there is an advantage in suppressing chromatic aberration. As described in the description of Conditional Expression (21), in general, a material having a very large Abbe number has a low refractive index. Therefore, it is difficult for a lens made of such a material to ensure a refractive power. By not allowing the corresponding value of Conditional Expression (22) to be equal to or greater than the upper limit, it is easy to ensure the refractive power of the LB lens. As a result, there is an advantage in reducing the diameter of the lens closer to the image side than the LB lens. In order to obtain more favorable characteristics, it is more preferable that the imaging lens satisfies Conditional Expression (22-1), and it is yet more preferable that the imaging lens satisfies Conditional Expression (22-2).

$$72<vB<120 \tag{22}$$

$$82<vB<120 \tag{22-1}$$

$$92<vB<120 \tag{22-2}$$

Assuming that a spacing between the first positive lens and the second positive lens on the optical axis is Db12 and a focal length of the first positive lens is f1, it is preferable that the imaging lens satisfies Conditional Expression (23). By not allowing the corresponding value of Conditional Expression (23) to be equal to or less than the lower limit, there is an advantage in reducing the effective diameter of the lens closer to the image side than the second positive lens and the second positive lens. As a result, there is an advantage in achieving reduction in weight. By not allowing the corresponding value of Conditional Expression (23) to be equal to or greater than the upper limit, there is an advantage in shortening the total length of the lens system. In order to obtain more favorable characteristics, it is more preferable that the imaging lens satisfies Conditional Expression (23-1), and it is yet more preferable that the imaging lens satisfies Conditional Expression (23-2).

$$0.08<Db12/f1<0.2 \tag{23}$$

$$0.09<Db12/f1<0.17 \tag{23-1}$$

$$0.1<Db12/f1<0.15 \tag{23-2}$$

A lens continuously disposed on the image side of the second positive lens is set as the third lens. Then, assuming that a spacing between the second positive lens and the third lens on the optical axis is Db23, and a focal length is f2, it is preferable that the imaging lens satisfies Conditional Expression (24). By not allowing the corresponding value of Conditional Expression (24) to be equal to or less than the lower limit, there is an advantage in reducing the effective diameter of the third lens and the lens closer to the image side than the third lens. As a result, there is an advantage in achieving reduction in weight. By not allowing the corresponding value of Conditional Expression (24) to be equal to or greater than the upper limit, there is an advantage in shortening the total length of the lens system. In order to obtain more favorable characteristics, it is more preferable that the imaging lens satisfies Conditional Expression (24-1), and it is yet more preferable that the imaging lens satisfies Conditional Expression (24-2).

$$0.05<Db23/f2<0.12 \tag{24}$$

$$0.06<Db23/f2<0.11 \tag{24-1}$$

$$0.07<Db23/f2<0.1 \tag{24-2}$$

The example shown in FIG. 1 is an example of the imaging lens of the present disclosure. The number of lenses constituting each group of the imaging lenses of the present disclosure can be different from the number shown in the example shown in FIG. 1. The aperture stop St and the vibration-proof group may be disposed at different positions from the example shown in FIG. 1.

Each group and each lens of imaging lenses can be configured as follows, for example. The first lens group G1 may be configured to consist of five positive lenses and three negative lenses. Alternatively, the first lens group G1 may be configured to consist of four positive lenses and two negative lenses.

The first positive lens may have a shape which is convex toward the object side. Such a shape is advantageous for achieving reduction in diameter of the lens closer to the image side than the first positive lens. The second positive lens may have a shape which is convex toward the object side. Such a shape is advantageous for achieving reduction in diameter of the lens closer to the image side than the second positive lens.

The LA lens may be a positive lens. In such a case, there is an advantage in correcting chromatic aberration. Assuming that an LA lens is a positive lens, the LA lens may be cemented to a negative lens. In such a case, there is a better advantage in correcting chromatic aberration. The LA lens may be a biconvex lens. In such a case, there is an advantage in ensuring the refractive power of the LA lens.

The LB lens may be a positive lens. In such a case, there is an advantage in correcting chromatic aberration. In a case where the LB lens is a positive lens, the LB lens may be cemented to a negative lens. In such a case, there is a better advantage in correcting chromatic aberration. The LB lens may be a positive meniscus lens which is convex toward the object side.

The second lens group G2 may be configured to consist of one single lens. In such a case, there is an advantage in achieving reduction in size and weight of the focus unit. The second lens group G2 may be configured to consist of one positive lens. In such a case, for example, the second lens group G2 may be configured to consist of one positive lens which is convex toward the object side.

The vibration-proof group may be continuously disposed on the aperture stop St. In such a case, the diameter of the vibration-proof group can be reduced. As a result, there is an advantage in achieving reduction in weight of the vibration-proof group. The vibration-proof group may be continuously disposed on the aperture stop St on the image side of the aperture stop St. In such a case, the diameter of the vibration-proof group can be reduced. As a result, there is an advantage in achieving reduction in weight of the vibration-proof group. Alternatively, the vibration-proof group may be continuously disposed in the second lens group G2. The vibration-proof group may include one or more positive lenses and one or more negative lenses. In such a case, there is an advantage in suppressing fluctuations in chromatic aberration during image blur correction.

The above-mentioned preferable configurations and available configurations including the configurations relating to the conditional expressions may be any combination, and it is preferable to optionally adopt the configurations in accordance with required specification. It should be noted that the conditional expressions that the imaging lens of the present disclosure preferably satisfies are not limited to the conditional expressions described in the form of the expression, and the lower limit and the upper limit are selected from the preferable, more preferable, and yet more preferable conditional expressions. The conditional expressions may include all conditional expressions obtained through optional combinations.

Next, examples of the imaging lens of the present disclosure will be described, with reference to the drawings. The reference numerals attached to the lenses in the cross-sectional views of each example are used independently for each example in order to avoid complication of description and drawings due to an increase in number of digits of the reference numerals. Accordingly, even in a case where common reference numerals are attached in the drawings of different examples, components do not necessarily have a common configuration.

EXAMPLE 1

Figure 2:
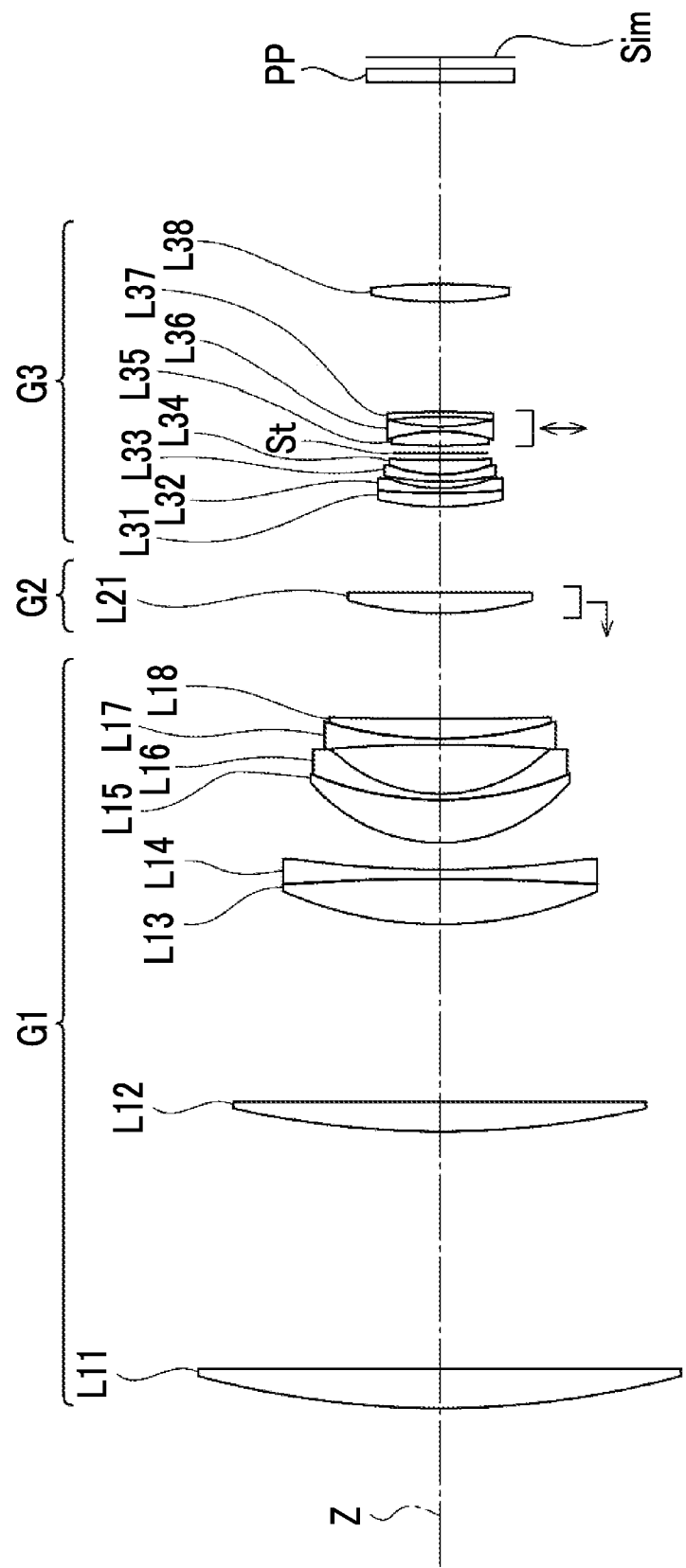
FIG. 2 is a cross-sectional view showing a configuration of an imaging lens of Example 1.

FIG. 2 is a cross-sectional view of a configuration of the imaging lens of Example 1. Since the basic illustration method of FIG. 2 is the same as that of FIG. 1, some duplicate descriptions will not be repeated here. The imaging lens of Example 1 consists of, in order from the object side to the image side, a first lens group G1 having a positive refractive power, a second lens group G2 having a positive refractive power, and a third lens group G3 having a positive refractive power. During focusing from the infinite distance object to the close-range object, the second lens group G2 moves toward the object side, and the first lens group G1 and the third lens group G3 remain stationary with respect to the image plane Sim.

Regarding the imaging lens of Example 1, Table 1 shows basic lens data, and Table 2 shows specifications. Table 1 is noted as follows. The column of Sn shows surface numbers in a case where the surface closest to the object side is the first surface and the number is increased one by one toward the image side. The column of R shows a curvature radius of each surface. The sign of the curvature radius of the convex surface facing toward the object side is positive and the sign of the curvature radius of the convex surface facing toward the image side is negative. The column of D shows a surface spacing between each surface and the surface adjacent to the image side on the optical axis. A value at the bottom cell of D indicates a spacing between the image plane Sim and the surface closest to the image side in the table. The column of Nd shows a refractive index of each component at the d line. The column of vd shows an Abbe number of each component based on the d line. The column of $\theta gF$ shows a partial dispersion ratio of each component between the g line and the F line. The column of $\Delta\theta gF$ shows an anomalous dispersibility of each component. In the present specification, assuming that the Abbe number based on the d line is vd and the partial dispersion ratio between the g line and the F line is $\theta gF$ for each component, the anomalous dispersibility $\Delta\theta gF$ is defined by the following expression.

$$\Delta\theta gF = \theta gF + 0.001618 \times vd - 0.6415$$

Table 1 also shows the aperture stop St and the optical member PP. In a cell of a surface number of a surface corresponding to the aperture stop St, the surface number and a term of (St) are noted. The rightmost column of Table 1 shows a reference sign of each corresponding lens group. For example, "G1" in Table 1 indicates that "G1" corresponds to the first lens group G1.

Table 2 shows a focal length f of the whole system, a back focal length Bf at the air conversion distance of the whole system, and an F number FNo., and a maximum total angle of view of 2ω. FNo of Conditional Expression (18), FNo. of the table of specifications, and FNo. of the aberration diagram to be described later are the same. [°] in the cell of 2ω indicates that the unit thereof is a degree. Table 2 shows values in a state in which the infinite distance object is in focus.

In the data of each table, degrees are used as a unit of an angle, and millimeters (mm) are used as a unit of a length, but appropriate different units may be used since the optical system can be used even in a case where the system is enlarged or reduced in proportion. Each of the following tables shows numerical values rounded off to predetermined decimal places.

TABLE 1

Example 1

| Sn | R | D | Nd | vd | θgF | ΔθgF | |
|---|---|---|---|---|---|---|---|
| 1 | 203.57988 | 8.250 | 1.48749 | 70.44 | 0.53062 | 0.0031 | G1 |
| 2 | ∞ | 50.000 | | | | | |
| 3 | 208.18521 | 6.250 | 1.48749 | 70.44 | 0.53062 | 0.0031 | |
| 4 | ∞ | 37.500 | | | | | |
| 5 | 86.53083 | 9.566 | 1.43700 | 95.10 | 0.53364 | 0.0460 | |
| 6 | −526.58055 | 2.000 | 1.74950 | 35.33 | 0.58189 | −0.0024 | |
| 7 | 230.81824 | 5.672 | | | | | |
| 8 | 37.25124 | 9.048 | 1.43700 | 95.10 | 0.53364 | 0.0460 | |
| 9 | 74.17008 | 1.278 | 1.65412 | 39.68 | 0.57378 | −0.0035 | |
| 10 | 34.47194 | 10.389 | | | | | |
| 11 | −316.12993 | 1.260 | 1.78880 | 28.43 | 0.60092 | 0.0054 | |
| 12 | 87.73991 | 4.140 | 1.92286 | 20.88 | 0.63900 | 0.0313 | |
| 13 | 710.52711 | 22.340 | | | | | |
| 14 | 74.22574 | 4.396 | 1.48749 | 70.44 | 0.53062 | 0.0031 | G2 |
| 15 | ∞ | 18.095 | | | | | |
| 16 | 59.76965 | 2.942 | 1.86966 | 20.02 | 0.64349 | 0.0344 | G3 |
| 17 | 186.06475 | 1.010 | 1.74950 | 35.33 | 0.58189 | −0.0024 | |
| 18 | 32.43849 | 1.407 | | | | | |
| 19 | 60.90904 | 1.500 | 1.92119 | 23.96 | 0.62025 | 0.0175 | |
| 20 | 32.46815 | 2.997 | 1.49700 | 81.61 | 0.53887 | 0.0294 | |
| 21 | 203.07270 | 1.567 | | | | | |
| 22(St) | ∞ | 1.500 | | | | | |
| 23 | 144.84558 | 3.036 | 1.80518 | 25.46 | 0.61572 | 0.0154 | |
| 24 | −38.36255 | 1.000 | 1.80610 | 40.73 | 0.56719 | −0.0084 | |
| 25 | 44.42132 | 2.069 | | | | | |
| 26 | −90.79207 | 1.000 | 1.92286 | 20.88 | 0.63900 | 0.0313 | |
| 27 | −249.79102 | 23.037 | | | | | |
| 28 | 77.33599 | 3.750 | 1.87070 | 40.73 | 0.56825 | −0.0073 | |
| 29 | −145.11248 | 42.744 | | | | | |
| 30 | ∞ | 2.850 | 1.51680 | 64.20 | 0.53430 | | |
| 31 | ∞ | 2.383 | | | | | |

TABLE 2

Example 1

| | |
|---|---|
| f | 290.922 |
| Bf | 47.006 |
| FNo. | 2.89 |
| 2ω[°] | 6.2 |

Figure 3:
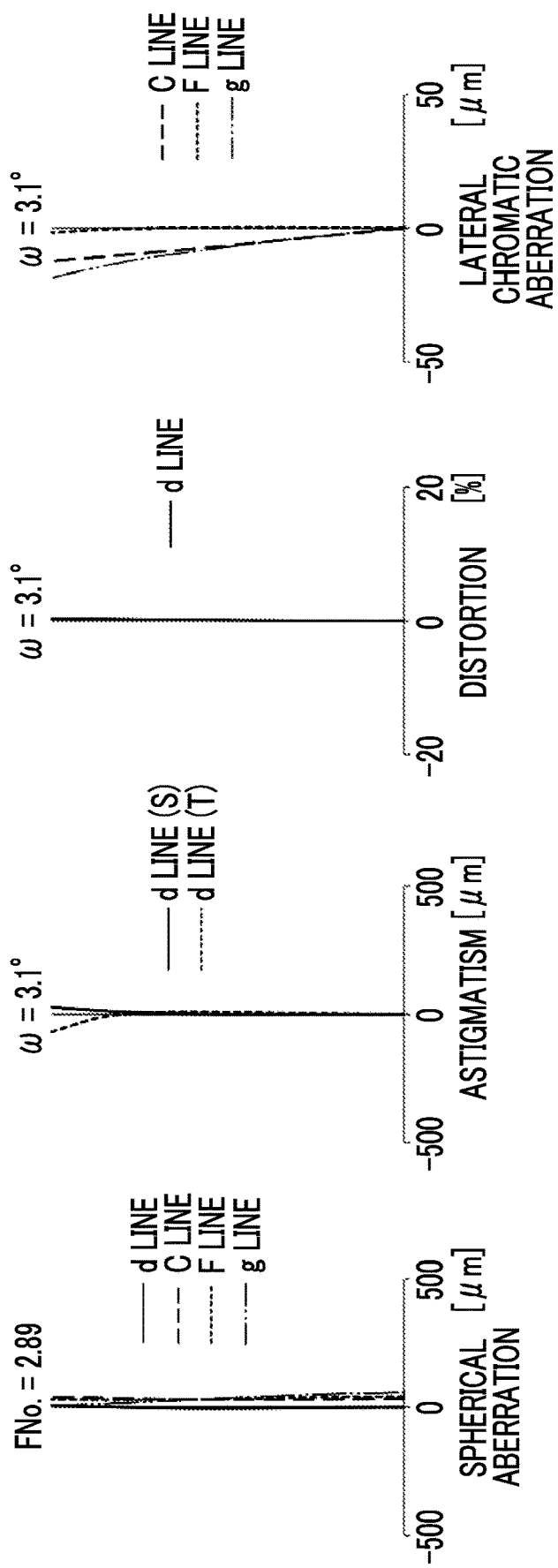
FIG. 3 is a diagram showing aberrations of the imaging lens of Example 1.

FIG. 3 shows aberration diagrams of the imaging lens of Example 1 in a state in which the infinite distance object is in focus. In FIG. 3, in order from the left side, spherical aberration, astigmatism, distortion, and lateral chromatic aberration are shown. In spherical aberration diagram, aberrations at the d line, the C line, the F line, and the g line are indicated by the solid line, the long broken line, the short broken line, and the two-dot chain line, respectively. In the astigmatism diagram, aberration in the sagittal direction at the d line is indicated by the solid line, and aberration in the tangential direction at the d line is indicated by the short broken line. In the distortion diagram, aberration at the d line is indicated by the solid line. In lateral chromatic aberration diagram, aberrations at the C line, the F line, and the g line are respectively indicated by the long broken line, the short broken line, and the two-dot chain line. In the spherical aberration diagram, the value of the F number is shown after "FNo.=". In other aberration diagrams, a value of the maximum half angle of view is shown after "ω=".

Symbols, meanings, description methods, and illustration methods of the respective data pieces according to Example 1 are the same as those in the following examples unless otherwise specified. Therefore, in the following description, repeated description will not be given.

EXAMPLE 2

Figure 4:
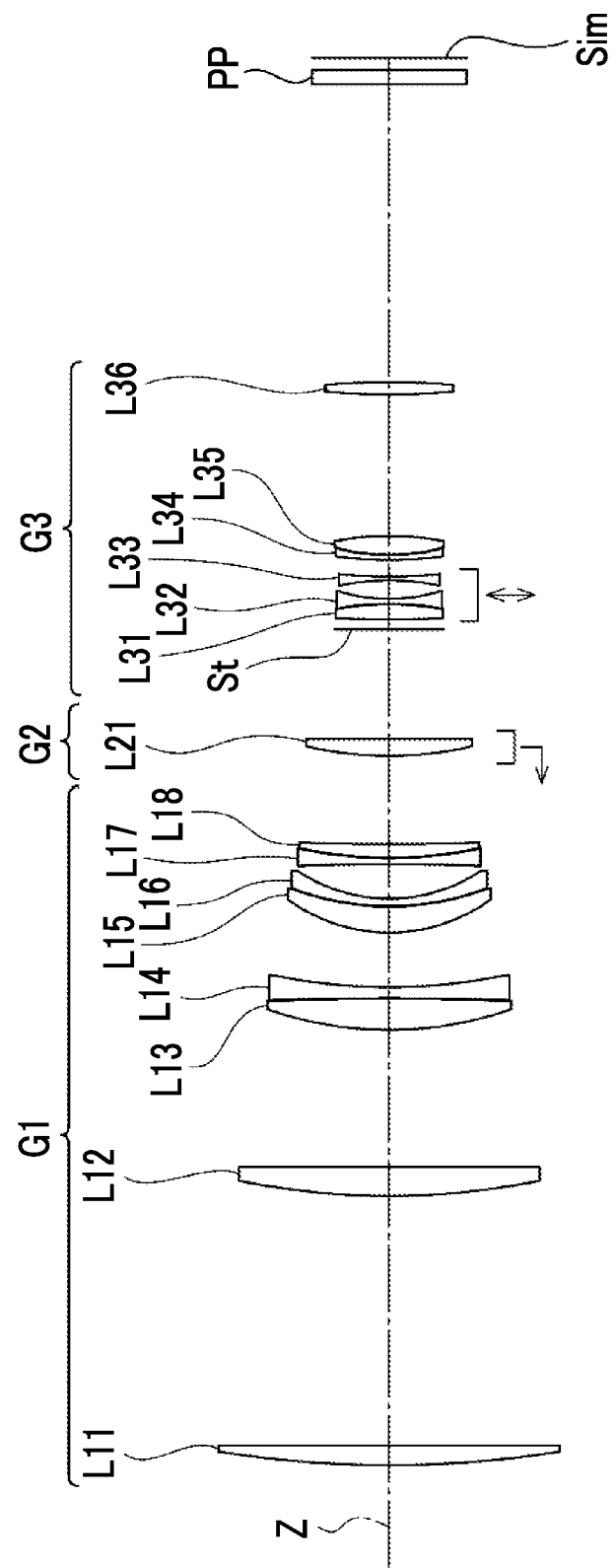
FIG. 4 is a cross-sectional view showing a configuration of an imaging lens of Example 2.

FIG. 4 is a cross-sectional view of a configuration of the imaging lens of Example 2. The imaging lens of Example 2 consists of, in order from the object side to the image side along the optical axis Z, a first lens group G1 having a positive refractive power, a second lens group G2 having a positive refractive power, and a third lens group G3 having a negative refractive power. During focusing from the infinite distance object to the close-range object, the second lens group G2 moves toward the object side, and the first lens group G1 and the third lens group G3 remain stationary with respect to the image plane Sim.

The lens groups of the imaging lens of Example 2 are configured as follows. The first lens group G1 consists of lenses L11 to L18 in order from the object side to the image side. The second lens group G2 consists of lens L21. The third lens group G3 includes an aperture stop St and lenses L31 to L36 in order from the object side to the image side. The vibration-proof group consists of lenses L31 to L33.

Figure 5:
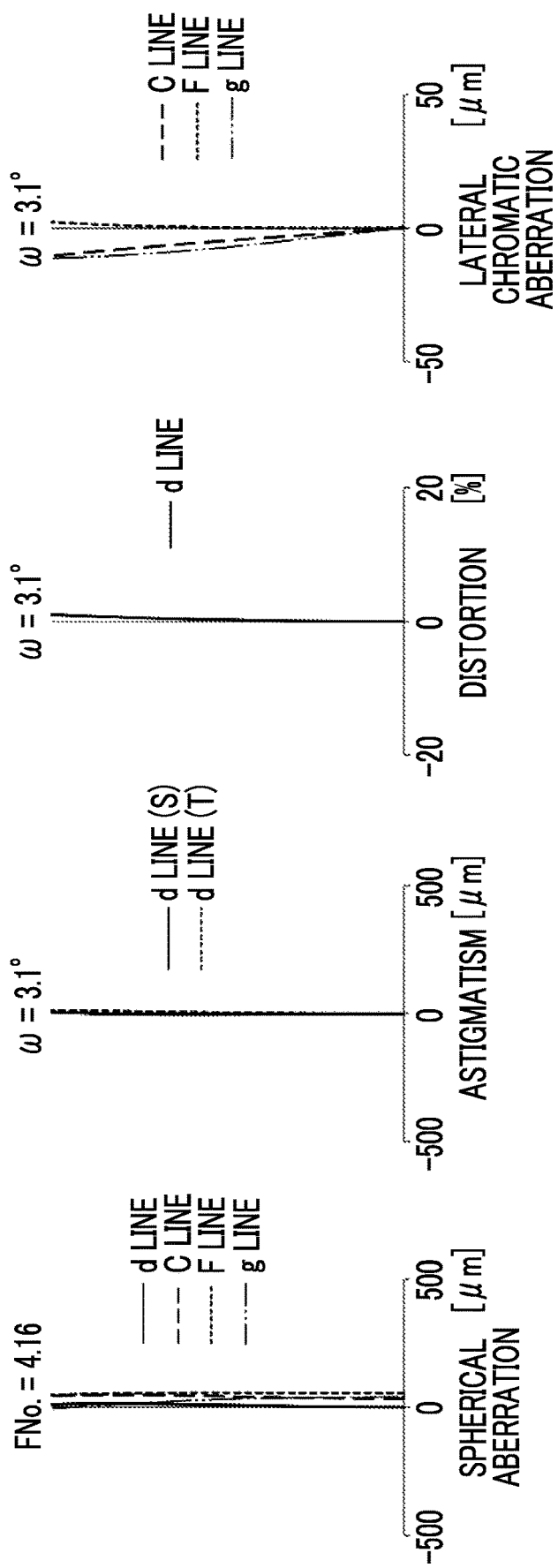
FIG. 5 is a diagram showing aberrations of the imaging lens of Example 2.

Regarding the imaging lens of Example 2, Table 3 shows the basic lens data, Table 4 shows the specifications, and FIG. 5 shows aberration diagrams in a state in which the infinite distance object is in focus.

TABLE 3

Example 2

| Sn | R | D | Nd | vd | θgF | ΔθgF | |
|---|---|---|---|---|---|---|---|
| 1 | 229.05819 | 3.940 | 1.48749 | 70.24 | 0.53007 | 0.0022 | G1 |
| 2 | ∞ | 50.039 | | | | | |
| 3 | 157.28918 | 5.815 | 1.48749 | 70.44 | 0.52933 | 0.0018 | |
| 4 | ∞ | 27.500 | | | | | |
| 5 | 78.79379 | 6.303 | 1.43875 | 94.66 | 0.53402 | 0.0457 | |
| 6 | −664.38740 | 2.260 | 1.61293 | 36.96 | 0.58507 | 0.0034 | |
| 7 | 120.85248 | 10.931 | | | | | |
| 8 | 36.23141 | 5.271 | 1.43875 | 94.94 | 0.53433 | 0.0464 | |
| 9 | 57.94102 | 1.510 | 1.64769 | 33.84 | 0.59243 | 0.0057 | |
| 10 | 34.42606 | 6.940 | | | | | |
| 11 | −463.67250 | 1.260 | 1.78880 | 28.43 | 0.60092 | 0.0054 | |
| 12 | 91.34182 | 2.786 | 1.92286 | 20.88 | 0.63900 | 0.0313 | |
| 13 | 549.29784 | 17.492 | | | | | |
| 14 | 79.13268 | 3.337 | 1.48749 | 70.44 | 0.53062 | 0.0031 | G2 |
| 15 | ∞ | 21.960 | | | | | |
| 16(St) | ∞ | 2.000 | | | | | G3 |
| 17 | 207.43313 | 3.119 | 1.86966 | 20.02 | 0.64349 | 0.0344 | |
| 18 | −61.49828 | 1.010 | 1.54814 | 45.78 | 0.56859 | 0.0012 | |
| 19 | 35.45710 | 3.719 | | | | | |
| 20 | −50.68199 | 0.800 | 1.83400 | 37.21 | 0.58082 | −0.0005 | |
| 21 | 116.39442 | 3.308 | | | | | |
| 22 | 85.37240 | 1.000 | 1.84666 | 23.78 | 0.61923 | 0.0162 | |
| 23 | 43.35052 | 3.792 | 1.56883 | 56.36 | 0.54890 | −0.0014 | |
| 24 | −62.16924 | 28.407 | | | | | |
| 25 | 150.43571 | 2.413 | 1.61293 | 36.96 | 0.58507 | 0.0034 | |
| 26 | −178.50209 | 59.772 | | | | | |
| 27 | ∞ | 2.850 | 1.51680 | 64.20 | 0.53430 | | |
| 28 | ∞ | 2.378 | | | | | |

TABLE 4

| Example 2 | |
|---|---|
| f | 290.926 |
| Bf | 64.029 |
| FNo. | 4.16 |
| 2ω[°] | 6.2 |

TABLE 6

| Example 3 | |
|---|---|
| f | 389.546 |
| Bf | 54.074 |
| FNo. | 4.13 |
| 2ω[°] | 4.6 |

EXAMPLE 3

Figure 6:
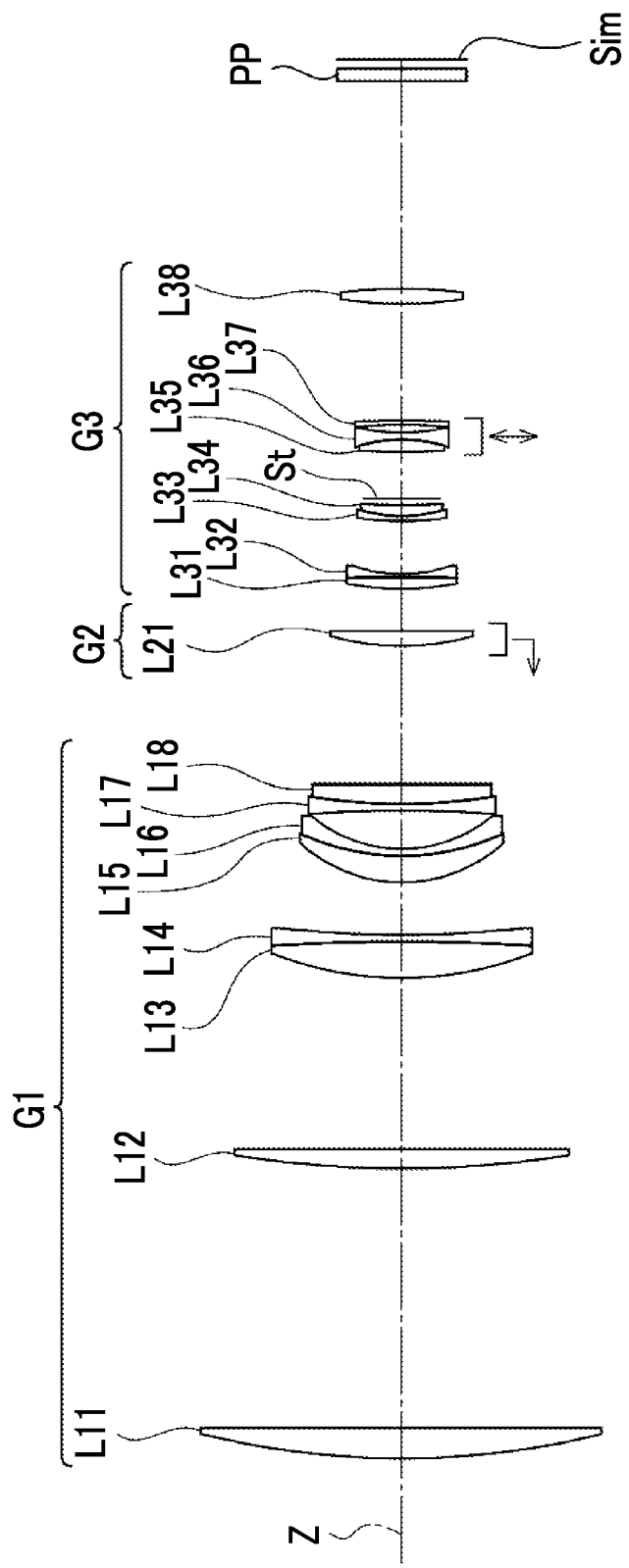
FIG. 6 is a cross-sectional view showing a configuration of an imaging lens of Example 3.

FIG. 6 is a cross-sectional view of a configuration of the imaging lens of Example 3. The imaging lens of Example 3 consists of, in order from the object side to the image side along the optical axis Z, a first lens group G1 having a positive refractive power, a second lens group G2 having a positive refractive power, and a third lens group G3 having a positive refractive power. During focusing from the infinite distance object to the close-range object, the second lens group G2 moves toward the object side, and the first lens group G1 and the third lens group G3 remain stationary with respect to the image plane Sim.

The lens groups of the imaging lens of Example 3 are configured as follows. The first lens group G1 consists of lenses L11 to L18 in order from the object side to the image side. The second lens group G2 consists of lens L21. The third lens group G3 consists of lenses L31 to L34, an aperture stop St, and lenses L35 to L38 in order from the object side to the image side. The vibration-proof group consists of lenses L35 to L37.

Figure 7:
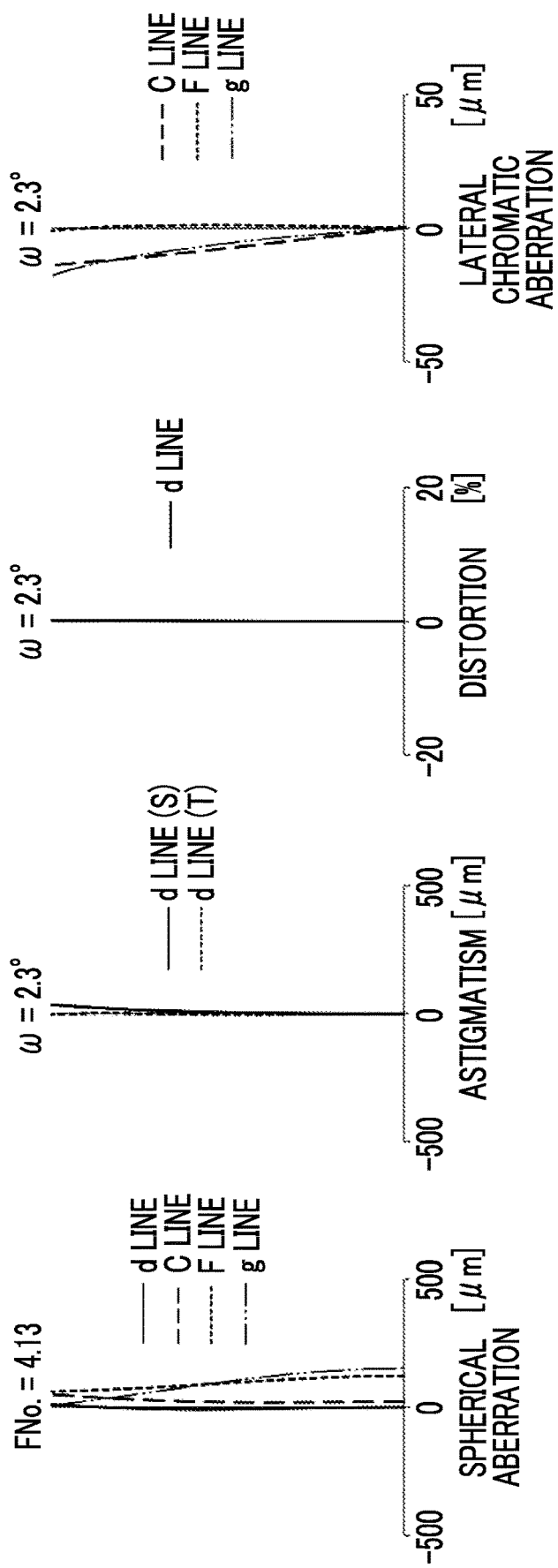
FIG. 7 is a diagram showing aberrations of the imaging lens of Example 3.

Regarding the imaging lens of Example 3, Table 5 shows the basic lens data, Table 6 shows the specifications, and FIG. 7 shows aberration diagrams in a state in which the infinite distance object is in focus.

EXAMPLE 4

Figure 8:
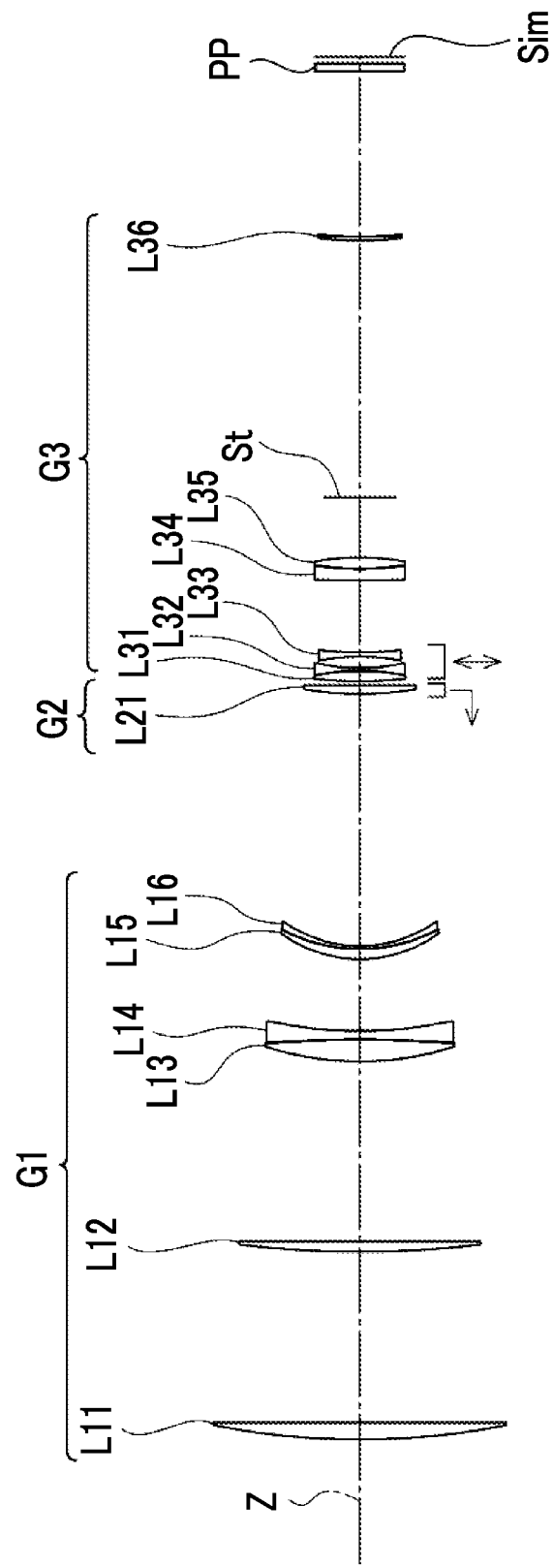
FIG. 8 is a cross-sectional view showing a configuration of an imaging lens of Example 4.

FIG. 8 is a cross-sectional view of a configuration of the imaging lens of Example 4. The imaging lens of Example 4 consists of, in order from the object side to the image side along the optical axis Z, a first lens group G1 having a positive refractive power, a second lens group G2 having a positive refractive power, and a third lens group G3 having a negative refractive power. During focusing from the infinite distance object to the close-range object, the second lens group G2 moves toward the object side, and the first lens group G1 and the third lens group G3 remain stationary with respect to the image plane Sim.

The lens groups of the imaging lens of Example 4 are configured as follows. The first lens group G1 consists of lenses L11 to L16 in order from the object side to the image side. The second lens group G2 consists of lens L21. The third lens group G3 consists of lenses L31 to L35, an aperture stop St, and a lens L36 in order from the object side to the image side. The vibration-proof group consists of lenses L31 to L33.

Figure 9:
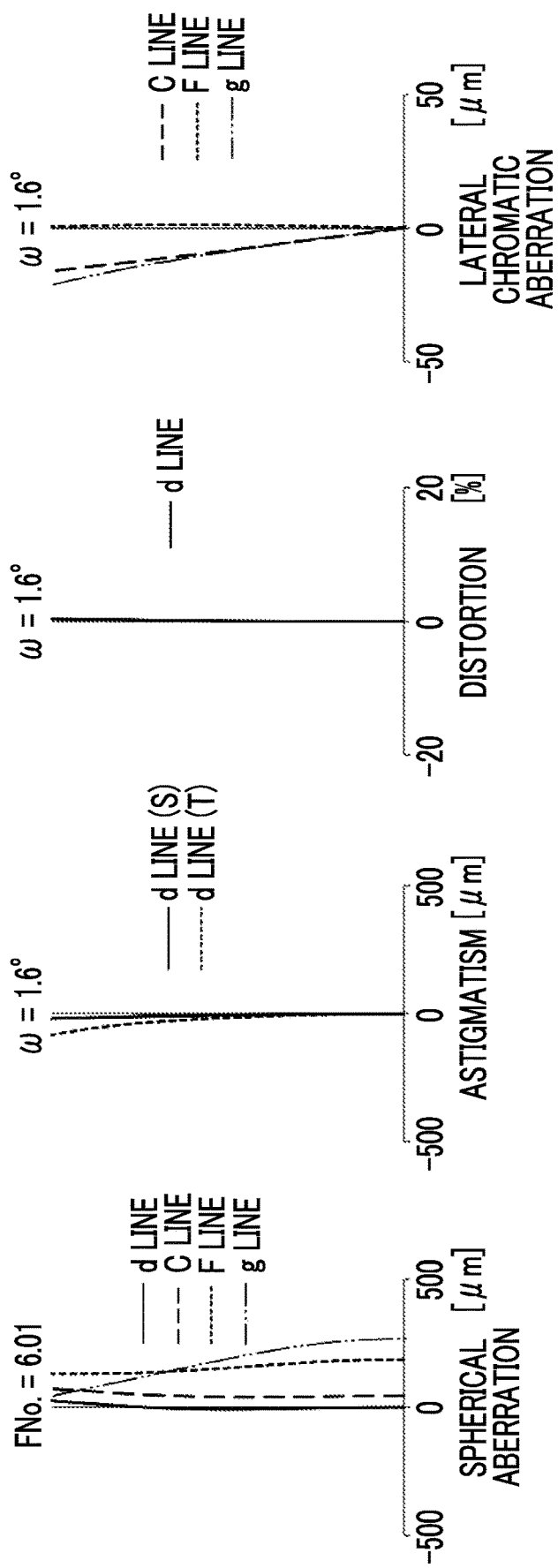
FIG. 9 is a diagram showing aberrations of the imaging lens of Example 4.

Regarding the imaging lens of Example 4, Table 7 shows the basic lens data, Table 8 shows the specifications, and FIG. 9 shows aberration diagrams in a state in which the infinite distance object is in focus.

TABLE 5

| Example 3 | | | | | | | |
|---|---|---|---|---|---|---|---|
| Sn | R | D | Nd | vd | θgF | ΔθgF | |
| 1 | 211.53862 | 7.252 | 1.48749 | 70.44 | 0.53062 | 0.0031 | G1 |
| 2 | ∞ | 62.259 | | | | | |
| 3 | 267.95082 | 4.604 | 1.48749 | 70.39 | 0.53005 | 0.0024 | |
| 4 | ∞ | 41.063 | | | | | |
| 5 | 89.23689 | 8.709 | 1.41390 | 100.82 | 0.53373 | 0.0554 | |
| 6 | −509.58801 | 1.660 | 1.74950 | 35.33 | 0.58189 | −0.0024 | |
| 7 | 281.07811 | 12.551 | | | | | |
| 8 | 37.66525 | 6.363 | 1.43700 | 95.12 | 0.53487 | 0.0473 | |
| 9 | 60.51525 | 1.683 | 1.65412 | 39.68 | 0.57378 | −0.0035 | |
| 10 | 35.33891 | 9.162 | | | | | |
| 11 | −307.46615 | 1.642 | 1.78880 | 28.43 | 0.60092 | 0.0054 | |
| 12 | 148.23359 | 4.542 | 1.92286 | 20.88 | 0.63900 | 0.0313 | |
| 13 | 14573.41616 | 33.100 | | | | | |
| 14 | 68.61172 | 3.608 | 1.48749 | 70.44 | 0.53062 | 0.0031 | G2 |
| 15 | ∞ | 10.083 | | | | | |
| 16 | 76.92864 | 2.678 | 1.86966 | 20.02 | 0.64349 | 0.0344 | G3 |
| 17 | −1611.45996 | 0.810 | 1.74950 | 35.33 | 0.58189 | −0.0024 | |
| 18 | 37.09489 | 12.725 | | | | | |
| 19 | 78.99797 | 1.185 | 1.92119 | 23.96 | 0.62025 | 0.0175 | |
| 20 | 35.62936 | 2.650 | 1.49700 | 81.61 | 0.53887 | 0.0294 | |
| 21 | 165.61393 | 1.575 | | | | | |
| 22(St) | ∞ | 11.180 | | | | | |
| 23 | 145.67577 | 2.958 | 1.80518 | 25.46 | 0.61572 | 0.0154 | |
| 24 | −36.90503 | 1.681 | 1.80610 | 40.73 | 0.56719 | −0.0084 | |
| 25 | 50.73120 | 1.860 | | | | | |
| 26 | −100.21107 | 1.000 | 1.92286 | 20.88 | 0.63900 | 0.0313 | |
| 27 | −338.45893 | 28.009 | | | | | |
| 28 | 99.93459 | 3.631 | 1.87070 | 40.73 | 0.56825 | −0.0073 | |
| 29 | −130.80965 | 49.849 | | | | | |
| 30 | ∞ | 2.850 | 1.51680 | 64.20 | 0.53430 | | |
| 31 | ∞ | 2.351 | | | | | |

TABLE 7

Example 4

| Sn | R | D | Nd | vd | θgF | ΔθgF | |
|---|---|---|---|---|---|---|---|
| 1 | 279.84919 | 5.870 | 1.48749 | 70.44 | 0.53062 | 0.0031 | G1 |
| 2 | ∞ | 59.296 | | | | | |
| 3 | 358.02786 | 3.644 | 1.48749 | 70.44 | 0.53062 | 0.0031 | |
| 4 | ∞ | 62.500 | | | | | |
| 5 | 111.41414 | 7.583 | 1.43700 | 95.10 | 0.53364 | 0.0460 | |
| 6 | −466.45152 | 3.010 | 1.61293 | 36.96 | 0.58507 | 0.0034 | |
| 7 | 156.05625 | 25.000 | | | | | |
| 8 | 48.53881 | 3.548 | 1.43700 | 95.10 | 0.53364 | 0.0460 | |
| 9 | 61.41312 | 1.010 | 1.64769 | 33.84 | 0.59243 | 0.0057 | |
| 10 | 48.05859 | 87.128 | | | | | |
| 11 | 111.80283 | 3.146 | 1.48749 | 70.44 | 0.53062 | 0.0031 | G2 |
| 12 | ∞ | 1.288 | | | | | |
| 13 | 157.75606 | 3.664 | 1.86966 | 20.02 | 0.64349 | 0.0344 | G3 |
| 14 | −78.91325 | 0.971 | 1.54814 | 45.78 | 0.56859 | 0.0012 | |
| 15 | 72.99165 | 3.895 | | | | | |
| 16 | −84.04550 | 1.500 | 1.83400 | 37.21 | 0.58082 | −0.0005 | |
| 17 | 139.94635 | 25.000 | | | | | |
| 18 | 493.43235 | 3.988 | 1.84666 | 23.78 | 0.61923 | 0.0162 | |
| 19 | 95.28570 | 4.004 | 1.56883 | 56.36 | 0.54890 | −0.0014 | |
| 20 | −89.07717 | 20.908 | | | | | |
| 21(St) | ∞ | 89.143 | | | | | |
| 22 | 117.64207 | 1.344 | 1.61293 | 36.96 | 0.58507 | 0.0034 | |
| 23 | 140.04873 | 57.314 | | | | | |
| 24 | ∞ | 2.850 | 1.51680 | 64.20 | 0.53430 | | |
| 25 | ∞ | 2.304 | | | | | |

TABLE 8

Example 4

| | |
|---|---|
| f | 581.587 |
| Bf | 61.499 |
| FNo. | 6.01 |
| 2ω[°] | 3.2 |

EXAMPLE 5

Figure 10:
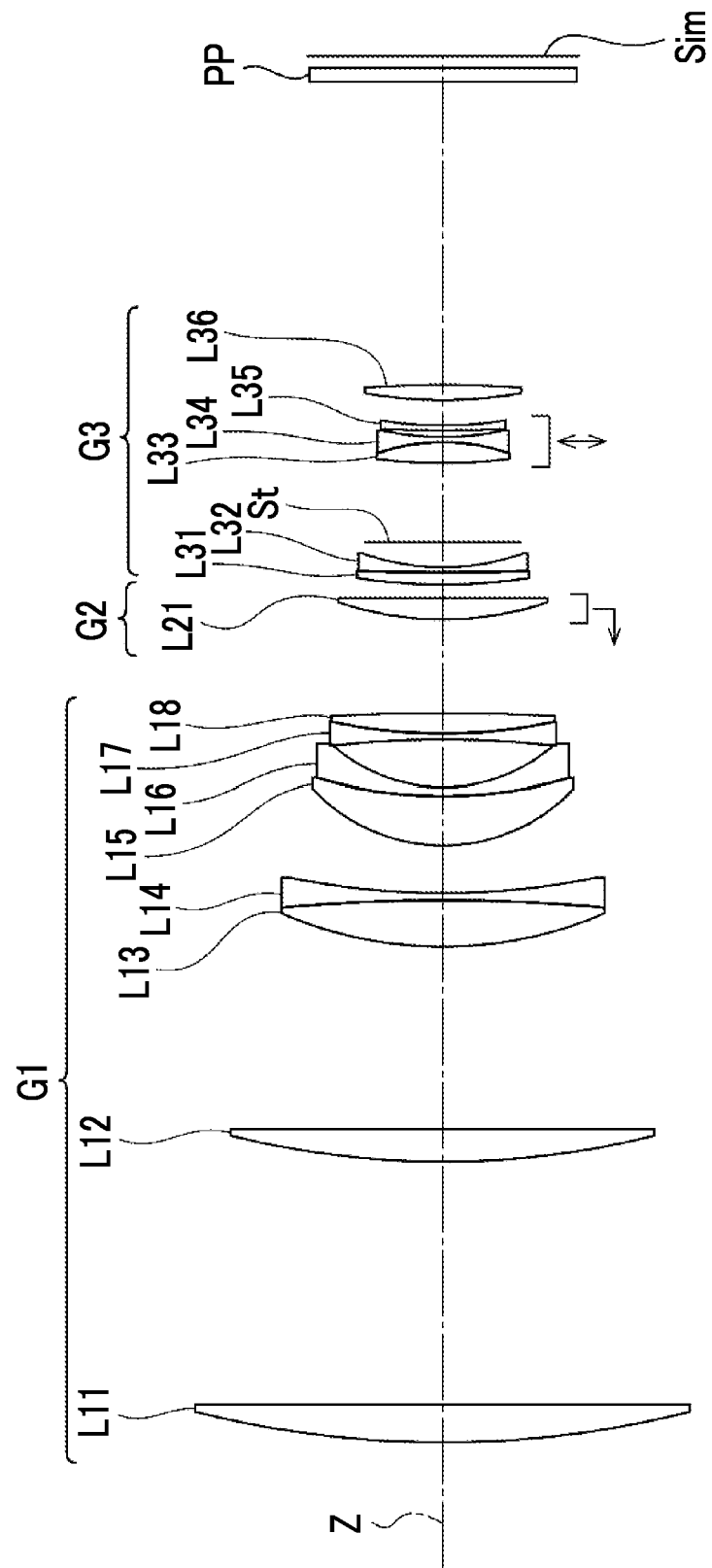
FIG. 10 is a cross-sectional view showing a configuration of an imaging lens of Example 5.

FIG. 10 is a cross-sectional view of a configuration of the imaging lens of Example 5. The imaging lens of Example 5 consists of, in order from the object side to the image side along the optical axis Z, a first lens group G1 having a positive refractive power, a second lens group G2 having a positive refractive power, and a third lens group G3 having a negative refractive power. During focusing from the infinite distance object to the close-range object, the second lens group G2 moves toward the object side, and the first lens group G1 and the third lens group G3 remain stationary with respect to the image plane Sim.

The lens groups of the imaging lens of Example 5 are configured as follows. The first lens group G1 consists of lenses L11 to L18 in order from the object side to the image side. The second lens group G2 consists of lens L21. The third lens group G3 consists of lenses L31 to L32, an aperture stop St, and lenses L33 to L36 in order from the object side to the image side. The vibration-proof group consists of lenses L33 to L35.

Figure 11:
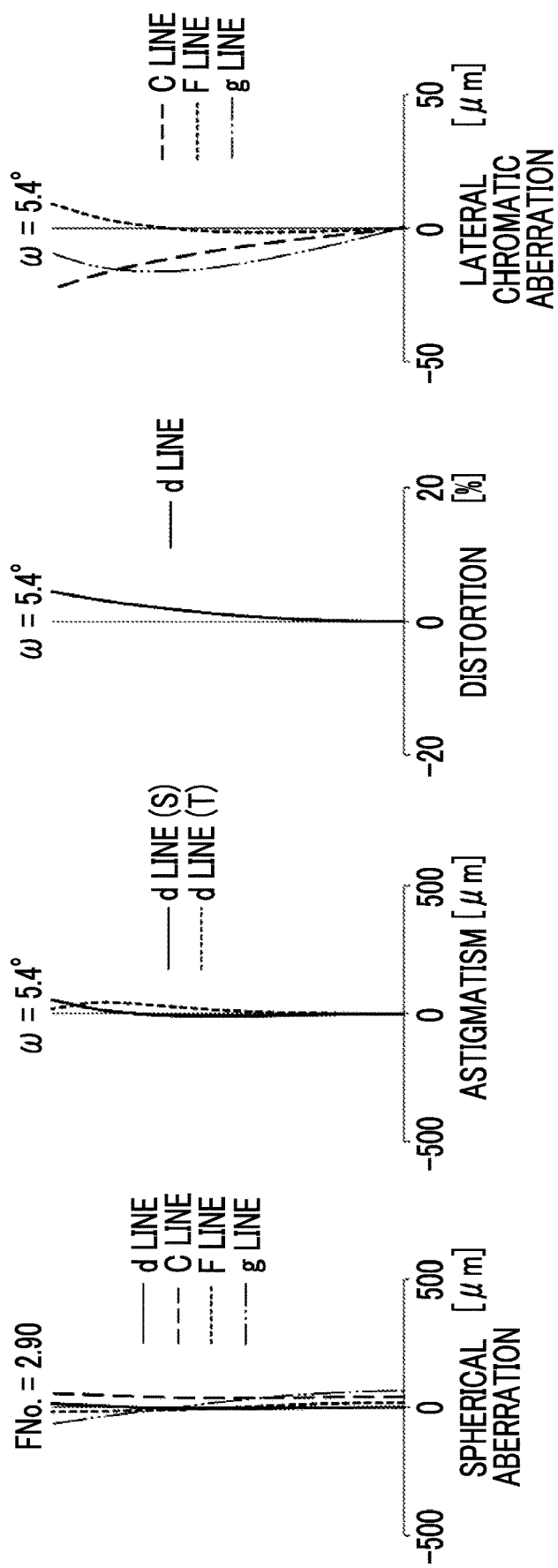
FIG. 11 is a diagram showing aberrations of the imaging lens of Example 5.

Regarding the imaging lens of Example 5, Table 9 shows the basic lens data, Table 10 shows the specifications, and FIG. 11 shows aberration diagrams in a state in which the infinite distance object is in focus.

TABLE 9

Example 5

| Sn | R | D | Nd | vd | θgF | ΔθgF | |
|---|---|---|---|---|---|---|---|
| 1 | 216.96166 | 7.750 | 1.48749 | 70.44 | 0.53062 | 0.0031 | G1 |
| 2 | ∞ | 50.000 | | | | | |
| 3 | 186.08490 | 6.750 | 1.48749 | 70.44 | 0.53062 | 0.0031 | |
| 4 | ∞ | 37.500 | | | | | |
| 5 | 87.89544 | 9.543 | 1.43700 | 95.10 | 0.53364 | 0.0460 | |
| 6 | −397.86542 | 1.500 | 1.74950 | 35.33 | 0.58189 | −0.0024 | |
| 7 | 163.83028 | 9.790 | | | | | |
| 8 | 38.48214 | 10.094 | 1.43700 | 95.10 | 0.53364 | 0.0460 | |
| 9 | 98.66113 | 1.766 | 1.65412 | 39.68 | 0.57378 | −0.0035 | |
| 10 | 36.08020 | 9.732 | | | | | |
| 11 | −214.44123 | 1.260 | 1.78880 | 28.43 | 0.60092 | 0.0054 | |
| 12 | 114.75999 | 4.152 | 1.92286 | 20.88 | 0.63900 | 0.0313 | |
| 13 | −501.26797 | 19.335 | | | | | |
| 14 | 71.87029 | 4.427 | 1.48749 | 70.44 | 0.53062 | 0.0031 | G2 |
| 15 | ∞ | 2.741 | | | | | |
| 16 | 127.41994 | 2.517 | 2.00100 | 29.13 | 0.59952 | 0.0052 | G3 |
| 17 | 653.97054 | 1.010 | 1.67270 | 32.17 | 0.59633 | 0.0069 | |
| 18 | 51.11743 | 5.221 | | | | | |
| 19(St) | ∞ | 16.244 | | | | | |
| 20 | 118.49525 | 4.328 | 1.84666 | 23.78 | 0.61923 | 0.0162 | |
| 21 | −42.25253 | 1.010 | 1.83481 | 42.74 | 0.56490 | −0.0074 | |
| 22 | 61.76817 | 1.405 | | | | | |
| 23 | 375.82846 | 1.000 | 1.98613 | 16.48 | 0.66558 | 0.0507 | |
| 24 | 87.45955 | 5.231 | | | | | |
| 25 | 98.60823 | 3.097 | 1.90043 | 37.37 | 0.57720 | −0.0038 | |
| 26 | −256.54078 | 62.379 | | | | | |
| 27 | ∞ | 2.850 | 1.51680 | 64.20 | 0.53430 | | |
| 28 | ∞ | 2.393 | | | | | |

TABLE 10

Example 5

| | |
|---|---|
| f | 291.010 |
| Bf | 66.653 |
| FNo. | 2.90 |
| 2ω[°] | 10.8 |

Table 11 shows corresponding values of Conditional Expressions (1) to (24) of the imaging lenses of Examples 1 to 5. Even in a case where there are a plurality of values that satisfy the conditional expressions, Table 11 typically shows one value of the values. Further, ΔθgFA and ΔθgFB in Table 11 are corresponding values of respective Conditional Expressions (1) and (7), and are represented by the following expressions.

$$\Delta\theta gFA = \theta gFA + 0.001618 \times vA - 0.6415$$

$$\Delta\theta gFB = \theta gFB + 0.001618 \times vB - 0.6415$$

TABLE 11

| Expression number | | Example 1 | Example 2 | Example 3 | Example 4 | Example 5 |
|---|---|---|---|---|---|---|
| (1) | ΔθgFA | 0.0460 | 0.0457 | 0.0554 | 0.0460 | 0.0460 |
| (2) | HAf/H1f | 0.654 | 0.717 | 0.654 | 0.683 | 0.657 |
| (3) | H1f/DL1 | 6.093 | 8.866 | 6.506 | 8.242 | 6.469 |

TABLE 11-continued

| Expression number | | Example 1 | Example 2 | Example 3 | Example 4 | Example 5 |
|---|---|---|---|---|---|---|
| (4) | ω | 2.79 | 2.77 | 2.08 | 1.39 | 5.16 |
| (5) | H2f/H1f | 0.862 | 0.884 | 0.843 | 0.888 | 0.870 |
| (6) | H2f/DL2 | 6.932 | 5.308 | 8.635 | 11.795 | 6.459 |
| (7) | ΔθgFB | 0.046 | 0.046 | 0.047 | 0.046 | 0.046 |
| (8) | HBf/H1f | 0.536 | 0.596 | 0.526 | 0.565 | 0.540 |
| (9) | Sg1 | 2.45 | 2.46 | 2.45 | 2.45 | 2.45 |
| (10) | Sg2 | 2.45 | 2.43 | 2.48 | 2.45 | 2.45 |
| (11) | f/|fG2| | 1.911 | 1.792 | 2.768 | 2.536 | 1.974 |
| (12) | HG2f/H1f | 0.370 | 0.465 | 0.346 | 0.339 | 0.391 |
| (13) | f/|fis| | 5.498 | 8.661 | 6.485 | 7.770 | 4.183 |
| (14) | Hisf/H1f | 0.195 | 0.305 | 0.165 | 0.325 | 0.261 |
| (15) | DSt/f | 0.693 | 0.575 | 0.590 | 0.450 | 0.636 |
| (16) | Bf/(f × tanω) | 3.319 | 4.546 | 3.815 | 4.345 | 2.537 |
| (17) | TL/f | 0.976 | 0.966 | 0.858 | 0.824 | 0.976 |
| (18) | f/FNo | 100.53 | 70.61 | 94.55 | 100.83 | 100.28 |
| (19) | ν1 | 70.44 | 70.24 | 70.44 | 70.44 | 70.44 |
| (20) | ν2 | 70.44 | 70.44 | 70.39 | 70.44 | 70.44 |
| (21) | νA | 95.10 | 94.66 | 100.82 | 95.10 | 95.10 |
| (22) | νB | 95.10 | 94.94 | 95.12 | 95.10 | 95.10 |
| (23) | Db12/f1 | 0.120 | 0.106 | 0.143 | 0.103 | 0.112 |
| (24) | Db23/f2 | 0.088 | 0.085 | 0.075 | 0.085 | 0.098 |

Although the imaging lenses of Examples 1 to 5 are configured to be lightweight while being telephoto lens systems, F numbers thereof are less than 6.1. In particular, the imaging lenses of Examples 1 and 5 have F numbers less than 3. As a result, small F numbers are achieved. Further, in the imaging lenses of Examples 1 to 5, various aberrations including chromatic aberration are satisfactorily corrected to achieve high optical performance.

Figure 12:
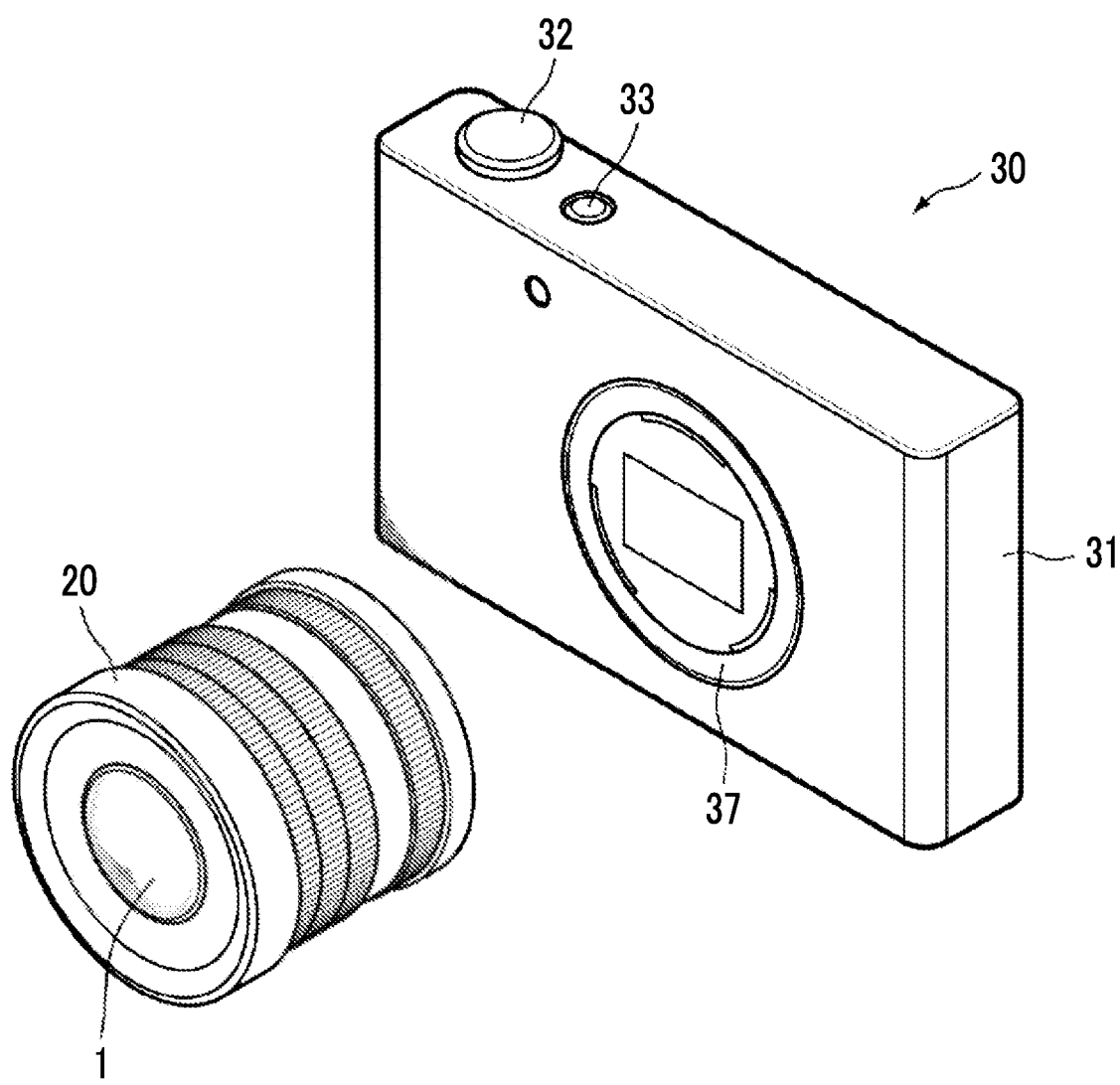
FIG. 12 is a perspective view of the front side of the imaging apparatus according to an embodiment.
Figure 13:
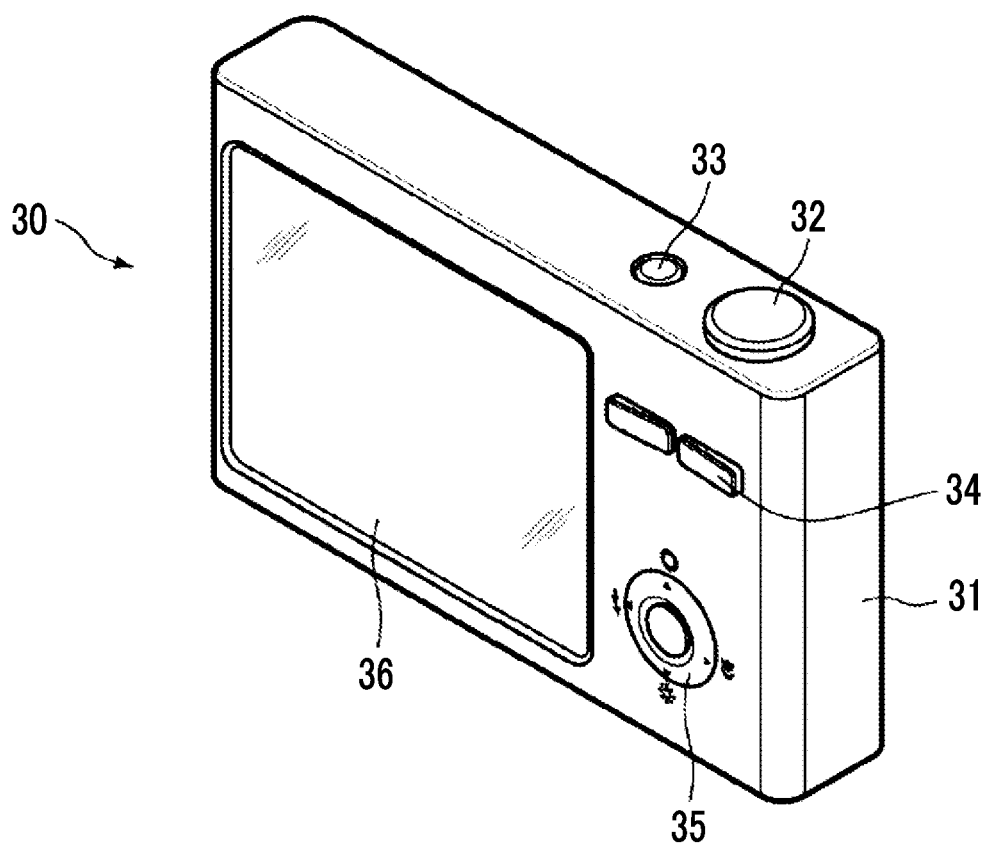
FIG. 13 is a perspective view of the rear side of the imaging apparatus according to the embodiment.

Next, an imaging apparatus according to an embodiment of the present disclosure will be described. FIGS. 12 and 13 are external views of a camera 30 which is the imaging apparatus according to the embodiment of the present disclosure. FIG. 12 is a perspective view of the camera 30 viewed from a front side, and FIG. 13 is a perspective view of the camera 30 viewed from a rear side. The camera 30 is a so-called mirrorless type digital camera, and the interchangeable lens 20 can be removably attached thereto. The interchangeable lens 20 is configured to include the imaging lens 1, which is housed in a lens barrel, according to an embodiment of the present disclosure.

The camera 30 comprises a camera body 31, and a shutter button 32 and a power button 33 are provided on an upper surface of the camera body 31. Further, an operating part 34, an operating part 35, and a display unit 36 are provided on a rear surface of the camera body 31. The display unit 36 is able to display a captured image and an image within an angle of view before imaging.

An imaging aperture, through which light from an imaging target is incident, is provided at the center on the front surface of the camera body 31. A mount 37 is provided at a position corresponding to the imaging aperture. The interchangeable lens 20 is mounted on the camera body 31 with the mount 37 interposed therebetween.

In the camera body 31, there are provided an imaging element, a signal processing circuit, a storage medium, and the like. The imaging element such as a charge coupled device (CCD) or a complementary metal oxide semiconductor (CMOS) outputs a captured image signal based on a subject image which is formed through the interchangeable lens 20. The signal processing circuit generates an image through processing of the captured image signal which is output from the imaging element. The storage medium stores the generated image. The camera 30 is able to capture a still image or a video in a case where the shutter button 32 is pressed, and is able to store image data, which is obtained through imaging, in the storage medium.

The technique of the present disclosure has been hitherto described through embodiments and examples, but the technique of the present disclosure is not limited to the above-mentioned embodiments and examples, and may be modified into various forms. For example, values such as the curvature radius, the surface spacing, the refractive index, the Abbe number, and the aspherical coefficient of each lens are not limited to the values shown in the examples, and different values may be used therefor.

Further, the imaging apparatus according to the embodiment of the present disclosure is not limited to the above example, and may be modified into various forms such as a camera other than the mirrorless type, a film camera, and a video camera.

What is claimed is:

1. An imaging lens consisting of, in order from an object side to an image side: a first lens group that has a positive refractive power; a second lens group that has a refractive power; and a third lens group that has a refractive power,
   wherein the imaging lens consisting of the first lens group, the second lens group, and the third lens group comprises the features that:
   during focusing, the second lens group moves along an optical axis, a spacing between the first lens group and the second lens group changes, and a spacing between the second lens group and the third lens group changes,
   the first lens group includes a first positive lens disposed to be closest to the object side, a second positive lens disposed closer to the image side than the first positive lens, and an LA lens disposed closer to the image side than the second positive lens,
   a partial dispersion ratio of the LA lens between a g line and an F line is θgFA,
   an Abbe number of the LA lens based on a d line is νA,
   a height of an on-axis marginal ray from the optical axis on an object side surface of the LA lens in a state in which an infinite distance object is in focus and open F number is HAf, a height of the on-axis marginal ray from the optical axis on an object side surface of the first positive lens in a state in which the infinite distance object is in focus and open F number is H1f,
a center thickness of the first positive lens is DL1,
a maximum half angle of view of the imaging lens is ω,
a unit of ω is degree,
a height of the on-axis marginal ray from the optical axis on an object side surface of the second positive lens in a state in which the infinite distance object is in focus and open F number is H2f, and
Conditional Expressions (1), (2), (3), (4), and (5-3) are satisfied, which are represented by $$0.02 < \theta gFA + 0.001618 \times vA - 0.6415 < 0.1 \quad (1),$$

$$0.45 < HAf/H1f < 0.8 \quad (2),$$

$$5 < H1f/DL1 < 10 \quad (3),$$

$$0.8 < \omega > < 6 \quad (4), \text{ and}$$

$$0.75 < H2f/H1f < 0.91 \quad (5-3).$$

2. The imaging lens according to claim 1, wherein the imaging lens consisting of the first lens group, the second lens group, and the third lens group comprises the features that:
Conditional Expression (5-4) is satisfied, which is represented by $$0.8 < H2f/H1f < 0.888 \quad (5-4).$$

3. The imaging lens according to claim 1, wherein the imaging lens consisting of the first lens group, the second lens group, and the third lens group comprises the features that:
a center thickness of the second positive lens is DL2, and
Conditional Expression (6) is satisfied, which is represented by $$3.8 < H2f/DL2 < 14 \quad (6).$$

4. The imaging lens according to claim 1, wherein the imaging lens consisting of the first lens group, the second lens group, and the third lens group comprises the features that:
the first lens group includes an LB lens disposed closer to the image side than the LA lens,
a partial dispersion ratio of the LB lens between the g line and the F line is θgFB,
an Abbe number of the LB lens based on the d line is vB, and
Conditional Expression (7) is satisfied, which is represented by $$0.02 < \theta gFB + 0.001618 \times vB - 0.6415 < 0.1 \quad (7).$$

5. The imaging lens according to claim 4, wherein the imaging lens consisting of the first lens group, the second lens group, and the third lens group comprises the features that:
a height of the on-axis marginal ray from the optical axis on an object side surface of the LB lens in a state in which the infinite distance object is in focus and open F number is HBf, and Conditional Expression (8) is satisfied, which is represented by $$0.35 < HBf/H1f < 0.68 \quad (8).$$

6. The imaging lens according to claim 1, wherein the imaging lens consisting of the first lens group, the second lens group, and the third lens group comprises the features that:
a specific gravity of the first positive lens is Sg1, and Conditional Expression (9) is satisfied, which is represented by $$2 < Sg1 < 3 \quad (9).$$

7. The imaging lens according to claim 1, wherein the imaging lens consisting of the first lens group, the second lens group, and the third lens group comprises the features that:
a specific gravity of the second positive lens is Sg2, and Conditional Expression (10) is satisfied, which is represented by $$2 < Sg2 < 3 \quad (10).$$

8. The imaging lens according to claim 1, wherein the imaging lens consisting of the first lens group, the second lens group, and the third lens group comprises the features that:
the first lens group and the third lens group remain stationary with respect to an image plane during focusing.

9. The imaging lens according to claim 1, wherein the imaging lens consisting of the first lens group, the second lens group, and the third lens group comprises the features that:
the second lens group is a lens group that has a positive refractive power.

10. The imaging lens according to claim 1, wherein the imaging lens consisting of the first lens group, the second lens group, and the third lens group comprises the features that:
a focal length of the imaging lens in a state in which the infinite distance object is in focus is f,
a focal length of the second lens group is fG2, and
Conditional Expression (11) is satisfied, which is represented by $$1.3 < f/|fG2| < 5 \quad (11).$$

11. The imaging lens according to claim 1, wherein the imaging lens consisting of the first lens group, the second lens group, and the third lens group comprises the features that:
a height of the on-axis marginal ray from the optical axis on a lens surface closest to the object side in the second lens group in a state in which the infinite distance object is in focus and open F number is HG2f, and Conditional Expression (12) is satisfied, which is represented by $$0.2 < HG2f/H1f < 0.55 \quad (12).$$

12. The imaging lens according to claim 1, wherein the imaging lens consisting of the first lens group, the second lens group, and the third lens group comprises the features that:
the third lens group includes a vibration-proof group that moves in a direction intersecting with the optical axis during image blur correction.

13. The imaging lens according to claim 12, wherein the imaging lens consisting of the first lens group, the second lens group, and the third lens group comprises the features that:
a focal length of the imaging lens in a state in which the infinite distance object is in focus is f,
a focal length of the vibration-proof group is f is, and Conditional Expression (13) is satisfied, which is represented by $$2.5 < f'/|f_{is}| < 15 \quad (13).$$

14. The imaging lens according to claim 12, wherein the imaging lens consisting of the first lens group, the second lens group, and the third lens group comprises the features that:
a height of the on-axis marginal ray from the optical axis on a lens surface closest to the object side in the vibration-proof group in a state in which the infinite distance object is in focus and open F number is Hisf, and Conditional Expression (14) is satisfied, which is represented by $$0.11 < Hisf/H1f < 0.4 \quad (14).$$

15. The imaging lens according to claim 1, wherein the imaging lens consisting of the first lens group, the second lens group, and the third lens group comprises the features that:
the third lens group includes a stop.

16. The imaging lens according to claim 15, wherein the imaging lens consisting of the first lens group, the second lens group, and the third lens group comprises the features that:
a distance on the optical axis from a lens surface closest to the object side in the first lens group to the stop is DSt,
a focal length of the imaging lens in a state where the infinite distance object is in focus is f, and
Conditional Expression (15) is satisfied, which is represented by $$0.3 < DSt/f < 0.85 \quad (15).$$

17. The imaging lens according to claim 1, wherein the imaging lens consisting of the first lens group, the second lens group, and the third lens group comprises the features that:
a back focal length of the imaging lens at an air conversion distance in a state in which the infinite distance object is in focus is Bf,
a focal length of the imaging lens in a state where the infinite distance object is in focus is f, and
Conditional Expression (16) is satisfied, which is represented by $$1 < Bf/(f \times \tan \omega) < 5.5 \quad (16).$$

18. The imaging lens according to claim 1, wherein the imaging lens consisting of the first lens group, the second lens group, and the third lens group comprises the features that:
Conditional Expression (2-1) is satisfied, which is represented by $$0.55 < HAf/H1f < 0.77 \quad (2\text{-}1).$$

19. The imaging lens according to claim 1, wherein the imaging lens consisting of the first lens group, the second lens group, and the third lens group comprises the features that:
Conditional Expression (3-1) is satisfied, which is represented by $$5.5 < H1f/DL1 < 8.75 \quad (3\text{-}1).$$

20. An imaging apparatus comprising the imaging lens according to claim 1.

* * * * *